(12) United States Patent
Wirth et al.

(10) Patent No.: US 12,732,336 B2
(45) Date of Patent: Sep. 8, 2026

(54) DUPLEX OPERATION IN A WIRELESS COMMUNICATION NETWORK

(71) Applicant: Fraunhofer-Gesellschaft zur Foerderung der angewandten Forschung e.V., Munich (DE)

(72) Inventors: Thomas Wirth, Berlin (DE); Lars Thiele, Berlin (DE); Thomas Haustein, Berlin (DE); Chaitali Pawase, Berlin (DE); Priyanka Dey, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 19/382,136

(22) Filed: Nov. 6, 2025

(65) Prior Publication Data

US 2026/0095298 A1 Apr. 2, 2026

Related U.S. Application Data

(63) Continuation of application No. PCT/EP2025/078264, filed on Oct. 1, 2025.

(30) Foreign Application Priority Data

Oct. 2, 2024 (EP) .................................... 24204393

(51) Int. Cl.
*H04L 5/14* (2006.01)
*H04W 74/0833* (2024.01)

(52) U.S. Cl.
CPC ........... *H04L 5/14* (2013.01); *H04W 74/0833* (2013.01)

(58) Field of Classification Search
CPC ............................ H04L 5/14; H04W 74/0833
See application file for complete search history.

(56) References Cited

U.S. PATENT DOCUMENTS

2017/0127415 A1 5/2017 Chien
2017/0134236 A1* 5/2017 Patel .................... H04L 5/0044
(Continued)

FOREIGN PATENT DOCUMENTS

CN 101742682 A 6/2010
CN 101808402 A 8/2010
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 18)", 3GPP TS 36.300 V18.2.0, https://3gpp.guru/trts/Rel-18/36300-i20.html#:~:text=36.300, Jun. 2024, 382 pp.
(Continued)

*Primary Examiner* — Ivan O Latorre
(74) *Attorney, Agent, or Firm* — Perkins Coie LLP; Michael A. Glenn

(57) ABSTRACT

A user device, UE, for a wireless communication is disclosed which communicates with one or more radio devices using a radio signal comprising a plurality of time blocks in a time domain. The radio signal includes a plurality of time blocks used for a communication between the UE and the one or more radio devices, and one or more additional time blocks not used for a communication between the UE and the one or more radio devices. The UE communicates with one or more of the radio devices using two or more of the time blocks, the two or more time blocks being offset by at least one of the additional time blocks of the radio signal.

12 Claims, 25 Drawing Sheets

(56) References Cited

U.S. PATENT DOCUMENTS

| | | | | |
|---|---|---|---|---|
| 2019/0089502 | A1* | 3/2019 | Yi | H04W 16/14 |
| 2020/0187173 | A1* | 6/2020 | Ye | H04L 41/0806 |
| 2020/0236524 | A1* | 7/2020 | Ye | H04L 5/0094 |
| 2022/0053487 | A1* | 2/2022 | Sengupta | H04W 56/00 |
| 2022/0110136 | A1* | 4/2022 | Li | H04W 92/20 |
| 2022/0322350 | A1* | 10/2022 | Sayenko | H04B 7/18504 |
| 2024/0154685 | A1 | 5/2024 | Mouser et al. | |
| 2024/0196310 | A1* | 6/2024 | Sedin | H04W 48/08 |
| 2024/0292411 | A1* | 8/2024 | Ying | H04W 72/1268 |
| 2025/0113203 | A1* | 4/2025 | Zhou | H04W 16/14 |

FOREIGN PATENT DOCUMENTS

| | | | |
|---|---|---|---|
| WO | 2017167252 | A1 | 10/2017 |
| WO | 2018233640 | A1 | 12/2018 |

OTHER PUBLICATIONS

"3rd Generation Partnership Project; Technical Specification Group Radio Access Network; Evolved Universal Terrestrial Radio Access (E-UTRA); Satellite Access Node radio transmission and reception (Release 18)", 3GPP TS 36.108 V18.6.0, Jun. 2024, 67 pp.

"3rd Generation Partnership Project; Technical Specification Group Radio Access Network; Evolved Universal Terrestrial Radio Access (E-UTRA); User Equipment (UE) radio transmission and reception for satellite access (Release 18)", 3GPP TS 36.102 V18.5.0, Mar. 2024, 66 pp.

"3rd Generation Partnership Project; Technical Specification Group Radio Access Network; Study on Narrow-Band Internet of Things (NB-IoT) / enhanced Machine Type Communication (eMTC) support for Non-Terrestrial Networks (NTN) (Release 17)", 3GPP TR 36.763 V17.0.0, Jun. 2021, 73 pp.

"FL summary 2 of AI 8.15.2: Timing relationships for IoT-NTN", Moderator (Sony): 3GPP Draft; R1-2112553, 3rd Generation Partnership Project (3GPP), Mobile Competence Centre; 650, Route Des Lucioles; F-06921 Sophia-Antipolis Cedex; France, vol. RAN WG1, No. e-Meeting; Nov. 11, 2021-Nov. 19, 2021, XP052077420, Nov. 16, 2021, 37 pp.

Uploaded in 3 parts. Draft Report of 3GPP TSG RAN WG1 #109-e v0.1.0, MCC Support: (Online meeting, May 9-20, 2022), 3GPP Draft; Draft_Minutes_Report_RAN1#109-E_V010, 3rd Generation Partnership Project (3GPP), Mobile Competence Centre; 650, Route Des Lucioles; F-06921 Sophia-Antipolis Cedex; France, vol. RAN WG1, No. Aug. 22, 2022-Aug. 26, 2022, XP05219229, Jun. 3, 2022, 100 pp.

ETSI TS 136 300 V17.0.0 (May 2022), LTE; Evolved Universal Terrestrial Radio Access (E-Utra) and Evolved Universal Terrestrial Radio Access Network (E-UTRAN); Overall description; Stage 2 (3GPP TS 36.300 version 17.0.0 Release 17), May 2022.

ETSI TS 138 300 V16.6.0 (Sep. 2021), 5G; NR; NR and NG-RAN Overall description; Stage-2 (3GPP TS 38.300 version 16.6.0 Release 16), Sep. 2021.

ETSI TS 136 300 V13.14.0, LTE; Evolved Universal Terrestrial Radio Access (E-UTRA) and Evolved Universal Terrestrial Radio Access Network (E-UTRAN); Overall description; Stage 2 (3GPP TS 36.300 version 13.14.0 Release 13), Apr. 2020. Uploaded in 2 parts.

* cited by examiner 100
core network
102
external networks
RAN1
RAN2
RANn
backhaul 114

108₁
108₂
108₃
112₁
112₂
110₁
110₂
UE1
UE2
UE3
core
gNBs
gNB1
gNB2
gNB3
gNB4
gNB5
ANT
IoT
116₁
116₂
116₃
116₄
116₅
114₁
114₂
114₃
114₄
114₅
106₁
106₂
106₃
106₄
106₅
RANn

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Fig. 5

| $\mu$ | $\Delta f = 2^{\mu} \cdot 15$ [kHz] | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Fig. 6

| E-UTRA Operating Band | Uplink (UL) operating band<br>SAN receive<br>UE transmit | Downlink (DL) operating band<br>SAN transmit<br>UE receive | Duplex Mode |
|---|---|---|---|
| | FUL_low – FUL_high | FDL_low – FDL_high | |
| 256 | 1980 MHz - 2010 MHz | 2170 MHz - 2200 MHz | FDD |
| 255 | 1626.5 MHz -1660.5 MHz | 1525 MHz - 1559 MHz | FDD |
| 254 | 1610 MHz - 1626.5 MHz | 2483.5 MHz - 2500 MHz | FDD |
| 253 | 1668 MHz - 1675 MHz | 1518 MHz - 1525 MHz | FDD |
| NOTE: Satellite bands are numbered in descending order from 256. | | | |

core network
base station
signal processor
transceiver
signal processor
transceiver NTN Gateway
core network
base station
signal processor
transceiver
signal processor
transceiver UE
200
radio device 300
402
404a
406a
406b
404b
404
404a1
I
A (A)
(B)
(C)
activation periodicity
N=4
N=8
N=8
system frame number (SFN)
active frame
inactive frame
time
402
404a
404b
406

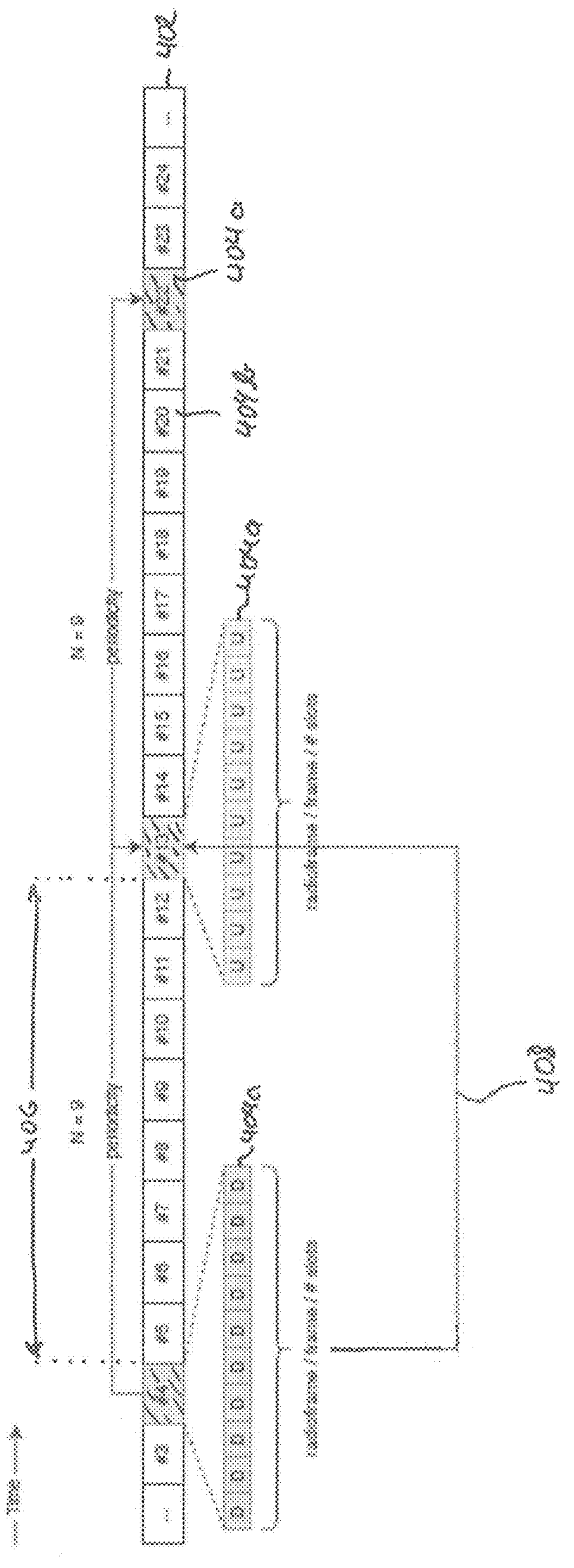

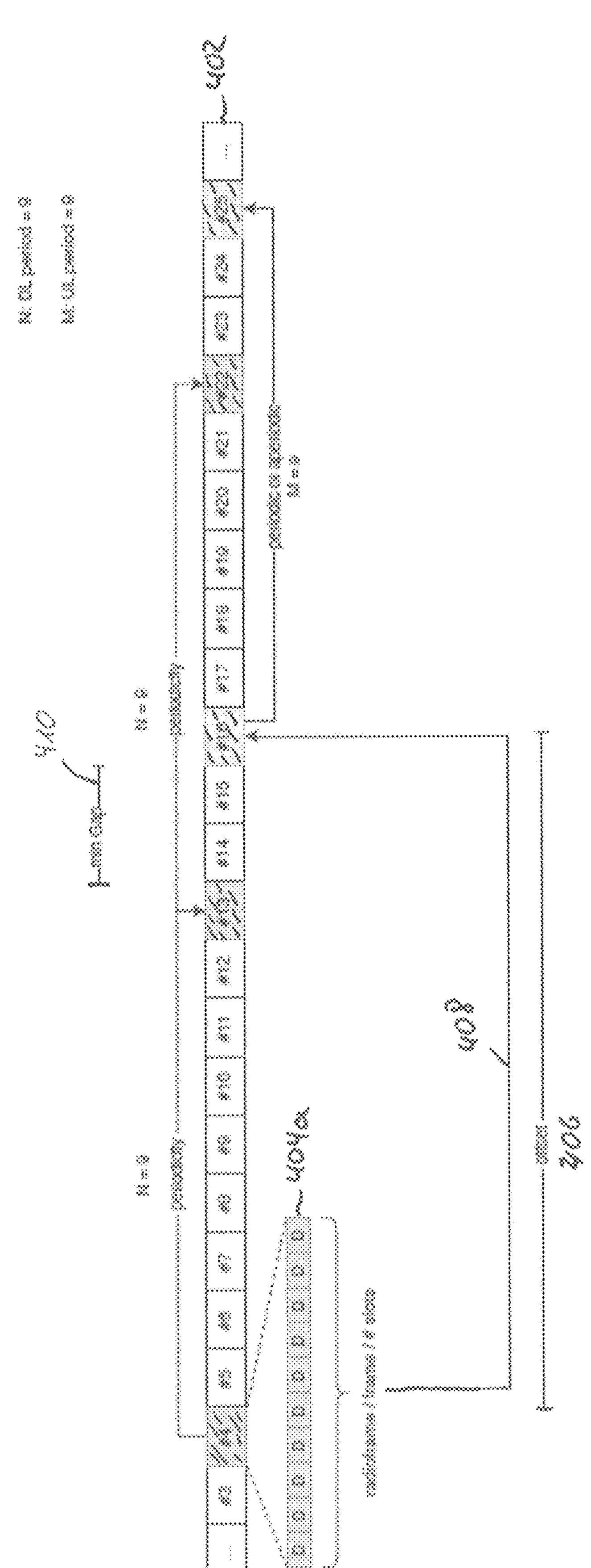
402
410
404a
408
406

402a
402b
408

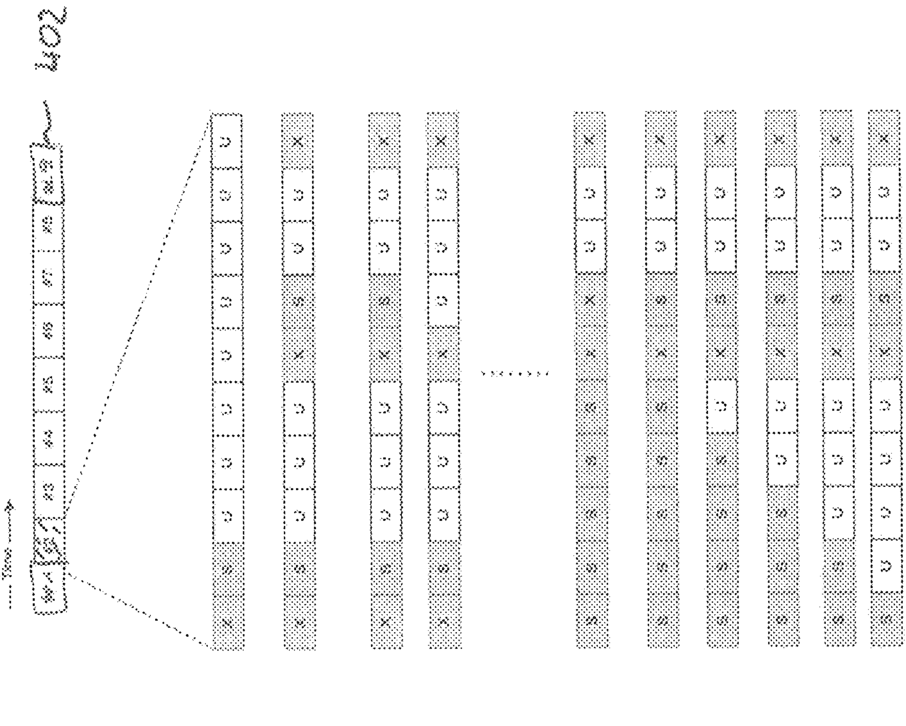
Fig. 22
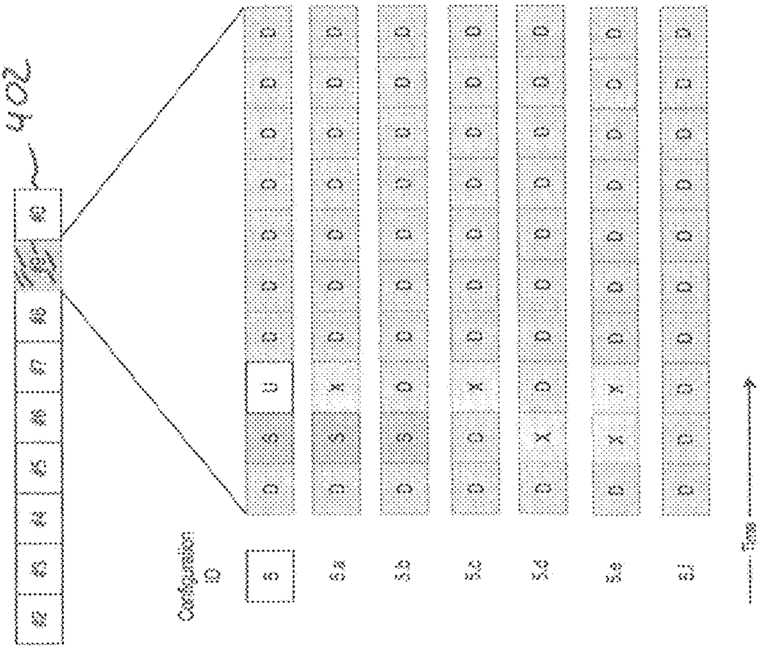
Fig. 24

DUPLEX OPERATION IN A WIRELESS COMMUNICATION NETWORK

CROSS-REFERENCE TO RELATED APPLICATIONS

This application is a continuation of copending International Application No. PCT/EP2025/078264, filed Oct. 1, 2025, which is incorporated herein by reference in its entirety, and additionally claims priority from European Application No. 24204393.3, filed Oct. 2, 2024, which is also incorporated herein by reference in its entirety.

The present invention refers to wireless communication networks or systems, more specifically to enhancements for operating user devices, UEs, like Internet-of-Thing, IoT, devices, IoT-UEs or narrowband IoT-UEs, in accordance with frequency division duplex, FDD, or time division duplex, TDD, or half-duplex FDD mechanisms.

BACKGROUND OF THE INVENTION

FIG. 1A and FIG. 1B schematically represent an example of a terrestrial wireless network 100 including, as is shown in FIG. 1A, the core network, CN, 102 and one or more radio access networks $RAN_1$, $RAN_2$, . . . $RAN_N$. FIG. 1B is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards, e.g., a base station in a 6G network. The BS may also comprise of integrated access and backhaul, IAB, nodes, e.g., an IAB Donor and/or IAB Node, consisting of a central unit, CU, as well as of a distributed unit, DU, and/or containing IAB-MTs including IAB mobile termination, MT. The term base station may also refer to an access point, AP, in any of the WiFi standards belonging, e.g., to the IEEE 802.11-family. A user may be a stationary device or a mobile device. The wireless communication system may also be accessed by mobile or stationary IoT devices which connect to a base station or to a user. The mobile or stationary devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1B shows an exemplary view of five cells, however, the $RAN_n$ may include more or less such cells, and $RAN_n$ may also include only one base station. FIG. 1B shows two users $UE_1$ and $UE_2$, also referred to as user device or user equipment, that are in cell 1062 and that are served by base station $gNB_2$. Another user $UE_3$ is shown in cell 1064 which is served by base station $gNB_4$. The arrows 1081, 1082 and 1083 schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1B shows two further devices 1101 and 1102 in cell 1064, like IoT devices, which may be stationary or mobile devices. The device 1101 accesses the wireless communication system via the base station $gNB_4$ to receive and transmit data as schematically represented by arrow 1121. The device 1102 accesses the wireless communication system via the user $UE_3$ as is schematically represented by arrow $112_2$. The respective base station $gNB_1$ to $gNB_5$ may be connected to the core network 102, e.g., via the S1 interface, via respective backhaul links $114_1$ to $114_5$, which are schematically represented in FIG. 1B by the arrows pointing to "core". The core network 102 may be connected to one or more external networks. The external network may be the Internet, or a private network, such as an Intranet or any other type of campus networks, e.g., a private WiFi communication system or a 4G or 5G mobile communication system. Further, some or all of the respective base station $gNB_1$ to $gNB_5$ may be connected, e.g., via the S1 or X2 interface or the XN interface in NR, with each other via respective backhaul links 1161 to 1165, which are schematically represented in FIG. 1B by the arrows pointing to "gNBs". A sidelink channel allows direct communication between UEs, also referred to as device-to-device, D2D, communication. The sidelink interface in 3GPP is named PC5. Note, that the term user equipment, UE, or user device may also refer to a station, STA, as used in any of the WiFi standards, e.g., belonging to the IEEE 802.11-family.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, and the physical sidelink broadcast channel, PSBCH, carrying for example a master information block, MIB, and one or more system information blocks, SIBs, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. The sidelink interface may support a 2-stage SCI which refers to a first control region containing some parts of the SCI, also referred to as the $1^{st}$-stage SCI, and optionally, a second control region which contains a second part of control information, also referred to as the $2^{nd}$-stage SCI.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g., 1 ms. Each subframe may include one or more slots of 12 or 14 OFDM symbols depending on the cyclic prefix, CP, length. A frame may consist of 2 half-frames, having a predefined length, e.g., 5 ms each. A frame may also have a smaller number of OFDM symbols, e.g., when utilizing shortened transmission time intervals, sTTI, or a mini-slot/non-slot-based frame structure comprising just a few OFDM symbols. Note, the system may also include a hyperframe, which consist of one or more frames.

The wireless communication system may be any single-tone or multicarrier system using frequency-division multiplexing, like the orthogonal frequency-division multiplexing, OFDM, system, the orthogonal frequency-division multiple access, OFDMA, system, or any other Inverse Fast Fourier Transform, IFFT, based signal with or without Cyclic Prefix, CP, e.g., Discrete Fourier Transform-spread-OFDM, DFT-s-OFDM. Other waveforms, like non-orthogonal waveforms for multiple access, e.g., filter-bank multicarrier, FBMC, generalized frequency division multiplexing, GFDM, or universal filtered multi carrier, UFMC, may be used. The wireless communication system may operate, e.g., in accordance with 3GPPs LTE, LTE-Advanced, LTE-Advanced Pro, or the 5G or 5G-Advanced or 6G or 3GPPs NR, New Radio, or within LTE-U, LTE Unlicensed or NR-U, New Radio Unlicensed, which is specified within the LTE and within NR specifications.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations.

The above-described wireless network may also include non-terrestrial network, NTN, components. The wireless communication network including terrestrial components and non-terrestrial components refers to networks or segments of networks using an airborne or spaceborne vehicle for transmission, i.e., a transceiver of the network communicating with the users and the core network is provided in an airborne or spaceborne vehicle. Spaceborne vehicles may include satellites with different altitudes or orbital periods, like a low earth orbit, LEO, a medium earth orbit, MEO, a geosynchronous orbit, GSO, a geostationary orbit, GEO, or a high earth orbit, HEO, whereas airborne vehicles may include unmanned aircraft systems, UAS, such as a tethered UAS, a lighter than air, LTA, UAS, a heavier than air, HTA, UAS, and a high altitude UAS platform, HAP.

FIG. 2 is a schematic representation of an example of a wireless communication network 150 including a core network 152, a radio access network 154 having respective base stations/NTN gateways $\mathbf{154}_1$ and $\mathbf{154}_2$, and a plurality of spaceborne transceivers 156, like satellites, and/or airborne transceivers 158, like unmanned aircraft systems. The respective spaceborne or airborne transceivers 156, 158 may be implemented in respective spaceborne or airborne vehicles, like the above-mentioned satellites or unmanned aircraft systems. The transceivers 156 and 158 are provided to serve one or more users, like the UE or the IoT device 110 shown in FIG. 2, which are provided on or above ground 160. The UE and the IoT device 110 may be devices as described above with reference to FIG. 1. The arrows 1581 to 1584 schematically represent uplink/downlink connections for communicating data between the user UE/IoT device 110 and the respective transceiver 156, 158, also referred to as service links. The transceivers 156, 158 are connected to the core network 152 via the RAN entities $\mathbf{154}_1$, $\mathbf{154}_2$, via respective links $\mathbf{162}_1$, $\mathbf{162}_2$, also referred to as feeder links. A NTN component may operate in accordance with the so called bent pipe or u-bent principle, sending back to earth what goes into the conduit with only amplification and a shift from uplink to downlink frequencies at the NTN component. A base station is provided on the ground, e.g., as part of the NTN gateways $\mathbf{154}_1$ and $\mathbf{154}_2$, or an entity separate from the NTN gateways. Payload transmitted using this principle is also referred to as bent pipe payload or transparent payload. In accordance with other examples, a NTN component may operate in accordance with the so called regenerative principle. Such a NTN component may use on-board processing so that the signal is demodulated, decoded, re-encoded and modulated aboard the NTN component. The base station functionality may be provided in the NTN component. Payload transmitted using this principle is also referred to as regenerative payload.

It is noted that the information in the above section is only for enhancing the understanding of the background of the invention and therefore it may contain information that does not form conventional technology that is already known to a person of ordinary skill in the art.

In a wireless communication network as described above, there may be a need for improvements in the communication between a user device and a radio device.

SUMMARY

An embodiment may have a user device, UE, for a wireless communication system, wherein the UE is to communicate with one or more radio devices using a radio signal comprising a plurality of time blocks in a time domain, wherein the radio signal comprises

- a plurality of time blocks used for a communication between the UE and the one or more radio devices, and
- one or more additional time blocks not used for a communication between the UE and the one or more radio devices, and wherein the UE is to communicate with one or more of the radio devices using two or more of the time blocks, the two or more time blocks being offset by at least one of the additional time blocks of the radio signal.

Another embodiment may have a radio device, like a gNB or NTN base station, for communicating with one or more user devices, UEs, of a wireless communication system, wherein the radio device is to communicate with the one or more UEs using a radio signal comprising a plurality of time blocks in a time domain, wherein the radio signal comprises

- a plurality of time blocks used for a communication between the UE and the one or more radio devices, and
- one or more additional time blocks not used for a communication between the UE and the one or more radio devices, and wherein the radio device is to communicate with one or more of the UEs using two or more of the time blocks, the two or more time blocks being offset by at least one of the additional time blocks of the radio signal.

According to another embodiment, a method for operating a user device, UE, for a wireless communication system, may have the step of: communicating with one or more radio devices using a radio signal comprising a plurality of time blocks in a time domain, wherein the radio signal comprises

- a plurality of time blocks used for a communication between the UE and the one or more radio devices, and
- one or more additional time blocks not used for a communication between the UE and the one or more radio devices, and wherein the UE communicates with one or more of the radio devices using two or more of the time blocks, the two or more time blocks being offset by at least one of the additional time blocks of the radio signal.

BRIEF DESCRIPTION OF THE DRAWINGS

Embodiments of the present invention will be detailed subsequently referring to the appended drawings, in which:

FIG. 5 illustrates a table of allowed TDD radio frame structures in accordance with the LTE specification, FIG. 6 illustrates a table showing the transmission numerologies supported by 5G-NR according to 3GPP TS 38.300, FIG. 13 illustrates a radio signal having active downlink and uplink frames in accordance with embodiments of the present invention, FIG. 14 illustrates a radio signal having active downlink frames with a first or DL period and active uplink frames with a with a second or UL period in accordance with embodiments of the present invention, FIG. 20(C) illustrates an IoT-NTN TDD mode using the a HD-FDD frame structure in accordance with embodiments of the present invention, FIG. 21 illustrates an LTE TDD downlink heavy slot/subframe assignment in accordance with embodiments of the present invention, FIG. 22 illustrates an LTE TDD uplink heavy slot/subframe assignment in accordance with embodiments of the present invention.

DETAILED DESCRIPTION OF THE INVENTION

Embodiments of the present invention are now described in more detail with reference to the accompanying drawings in which the same or similar elements have the same reference signs assigned.

Figures 1A, 1B:
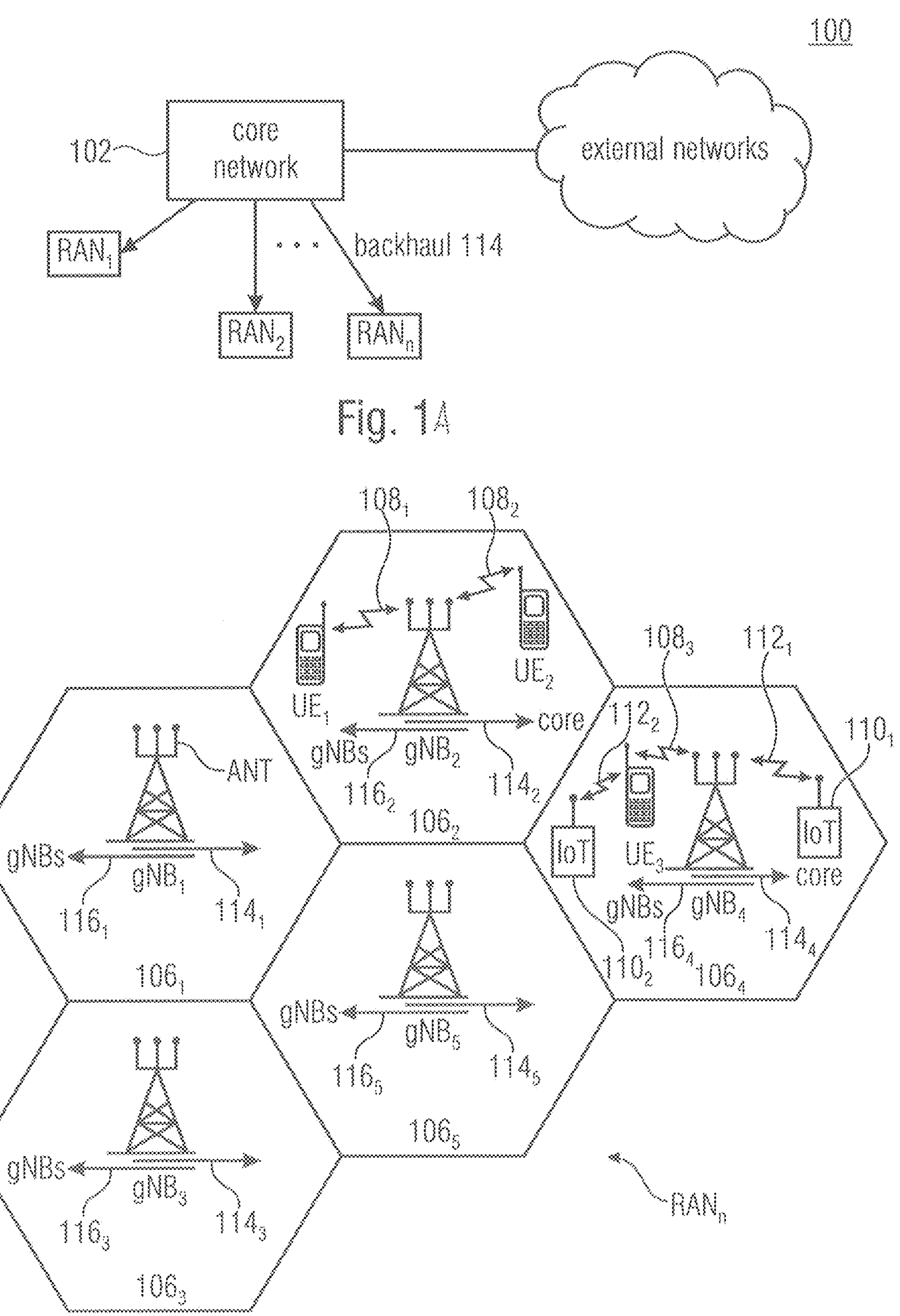
FIG. 1A and FIG. 1B illustrate an example of a terrestrial wireless communication network.
Figure 2:
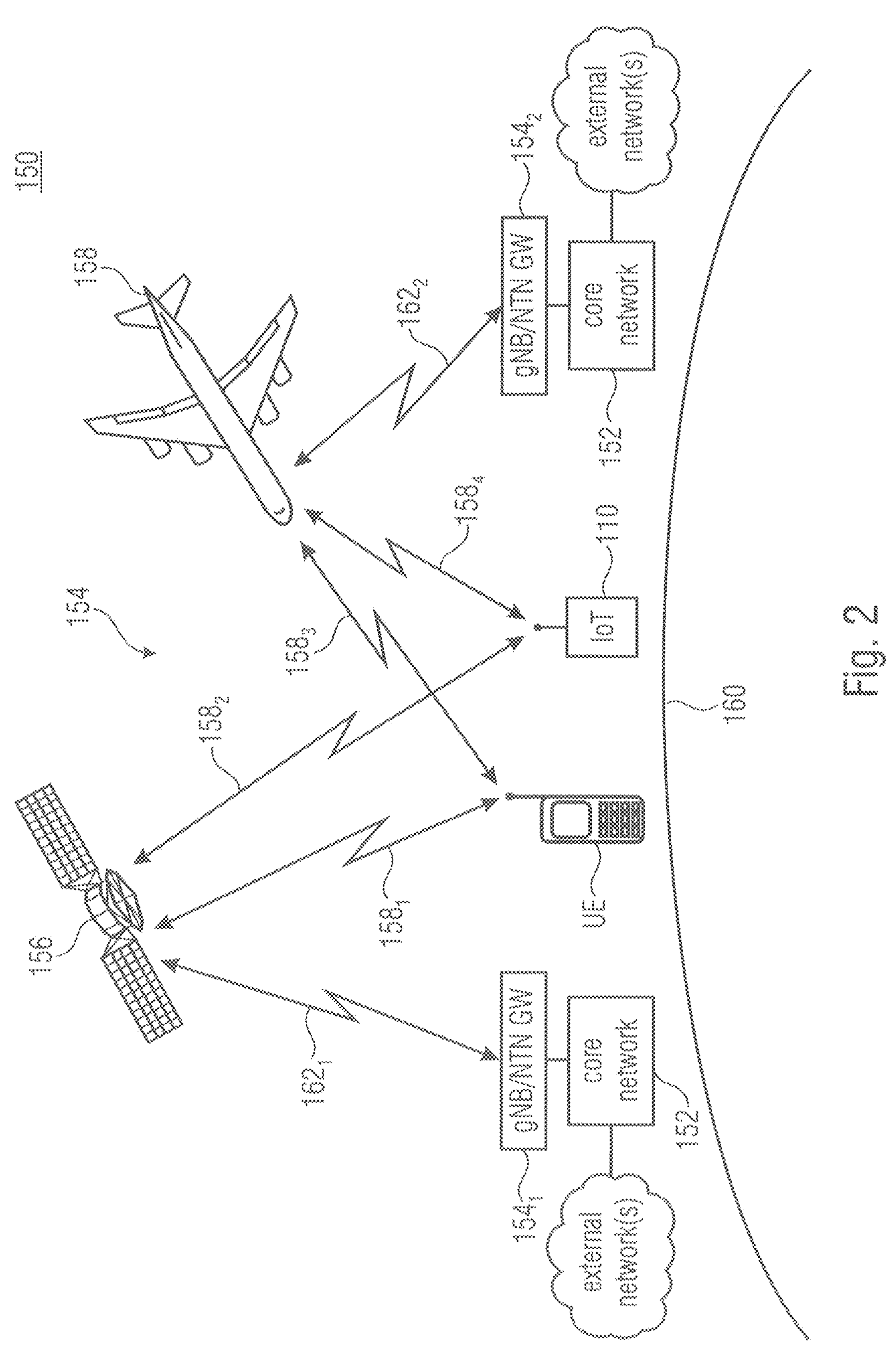
FIG. 2 illustrates an example of a non-terrestrial wireless communication network.

There is an increasing demand for connecting Internet-of-Things, IoT, sensors or other IoT devices to a wireless communication network as described above with reference to FIG. 1A and FIG. 1B and with reference to FIG. 2. For example, 3GPP standardizes cellular and IoT technologies, like LTE NB-IoT (Long-Term Evolution Narrowband IoT), eMTC (enhanced Machine Type Communication), LTE-NTN (LTE-Non-Terrestrial Network), NR-NTN (New Radio NTN) and RedCap (Reduced Capability) and Ambient IoT (A-IoT). Such devices may be low complexity and/or low power consuming devices, like sensor devices, for which an end-to-end connectivity from the device to the internet via a 3GPP core network, CN, may be desired. Also, devices, like IoT sensors, may benefit from features standardized, e.g., for eMBB (enhanced mobile broadband) devices, like mobility-related techniques or handover-techniques.

Currently, LTE-NTN or NR-NTN technologies support only frequency division duplex, FDD, frame structures in accordance with which downlink and uplink communications are separated in the frequency domain. To reduce costs of the above devices, like sensor devices, they may be configured in a half-duplex mode so that such a device is capable to only transmit or to only receive, however, it is not capable to do both at the same time. This may be implemented by tuning the radio frequency band of the device for uplink and downlink to the same carrier frequency, but operating uplink and downlink in a time-shifted manner using a large enough time gap between uplink and downlink, also known as half-duplex FDD, HDFDD. The benefit of this is that the inherent frame structure of the underlying uplink or downlink transmission does not need to be modified. Thus, no fast switching or extra guard bands have to be configured within a frame, in case the switching done is outside of the uplink or downlink frame structure. This allows for a simpler and thus cheaper design, as well as a reuse of existing IoT designs, with only a small change in the IoT-modems firmware. Although NB-IoT devices may support TDD frame structures, synchronizing switching between many such devices is difficult in cellular deployment with many devices. Thus, implementing a HDFDD may be more feasible for simpler or cheaper devices, such as NB-IoT devices. Furthermore, HDFDD allows an asymmetric mapping of downlink and uplink, allowing more downlink subframes than uplink subframes or vice versa, which may be adapted to the system requirements. This is not the case in a typically paired FDD spectrum, where in most deployments uplink and downlink carrier use the same bandwidth, e.g., a 20 MHz carrier. The latter may result in a waste of resources in case of asymmetric data traffic, e.g., more downlink than uplink traffic of vice versa, which is a typical service requirement for data services. E.g., the Internet services are in general rather downlink heavy, meaning that more data is send in the downlink when compared to the uplink. Thus, HDFDD enables a more efficient spectrum usage and therefore a more cost efficient deployment of telecommunication services.

At the base station, BS, side, this may be different, since a BS typically has a much larger processing power and may coordinate devices which it serves in such a way that it is able to receive and transmit simultaneously, even from half-duplex devices. Note, that a BS may even operate in a full duplex mode, since it is able to subtract its transmit signal from potential one or more received signal, allowing for a full duplex operation at the BS.

In case of an NTN, the system designed for purely terrestrial networks, TNs, may not be adopted without modifications. This, for example, is due to the fact that satellite communication involves much longer propagation delays, for example approximately 25 ms for LEO-600 satellites (LEO=Low Earth Orbit) or approximately 42 ms for LEO-1200 satellites. LEO-600 indicates that the satellites are in the Low Earth Orbit at an altitude of approximately 600 km, whereas LEO-1200 indicates that the satellites are in a Low Earth Orbit at an altitude of approximately 12000 km. Furthermore, non-geostationary satellites are moving, such that UEs on the ground which are stationary or quasi-stationary on the ground relative to the satellite, have to perform handovers on a regular basis, e.g., in the order of a couple of minutes. In contrary, for TN, it is rather the other way around, where UEs are moving on a cellular grid and have to perform handovers in case they come out of reach of a fixed BS.

For NTN communications one or more of the following issues need to be addressed:

- The timing advance, TA, resulting from the long propagation delays.
- The power control, PA, resulting from the higher transmit power, which may be needed to overcome the propagation delay.
- The timing in general, which may be affected if certain protocols on the radio resource connection, RRC, layer or on the medium access control, MAC, layer need a ping-pong communication between a user device or user equipment, UE, and a base station, BS, since transmissions in both directions need to cope with large propagation delays.

As mentioned above, the current LTE NTN specification and the current NR NTN specification support FDD configurations, and FDD decouples synchronization requirements for uplink and downlink transmissions within the same frequency band. Nevertheless, due to regulatory reasons, there may be certain frequency bands defined which are only regulated for a single direction transmission, e.g., downlink only operation, e.g., as used for multimedia broadcast. Furthermore, there may be spectrum, which is used by other services, which does not fulfil 3GPP TDD requirements, but which potentially support a kind of TDD operation with downlink and uplink operation being separated by a time offset. These frequency bands may also support a half-duplex FDD, HDFDD, operation within the same frequency band. In addition, if the time gap for a HDFDD operation is large enough, there may also be a possibility to operate other services, e.g., non-3GPP services, within the time gap. As long as these services do not interfere with the 3GPP service, a certain service-level for the 3GPP service may be maintained. Finally, in case no operation is performed in these time gaps, there may also be no transmission and/or reception in these gaps, which enables usage of power saving techniques. In case of NTN, this implies that the satellite may save power during such gaps by switching off its radio modules. This is an important feature for NTNs, since satellites have to operate under a stringent power constraint and such an operation may increase the lifespan of a satellite, reducing the investment and operational costs for NTN.

Figures 3, 4:
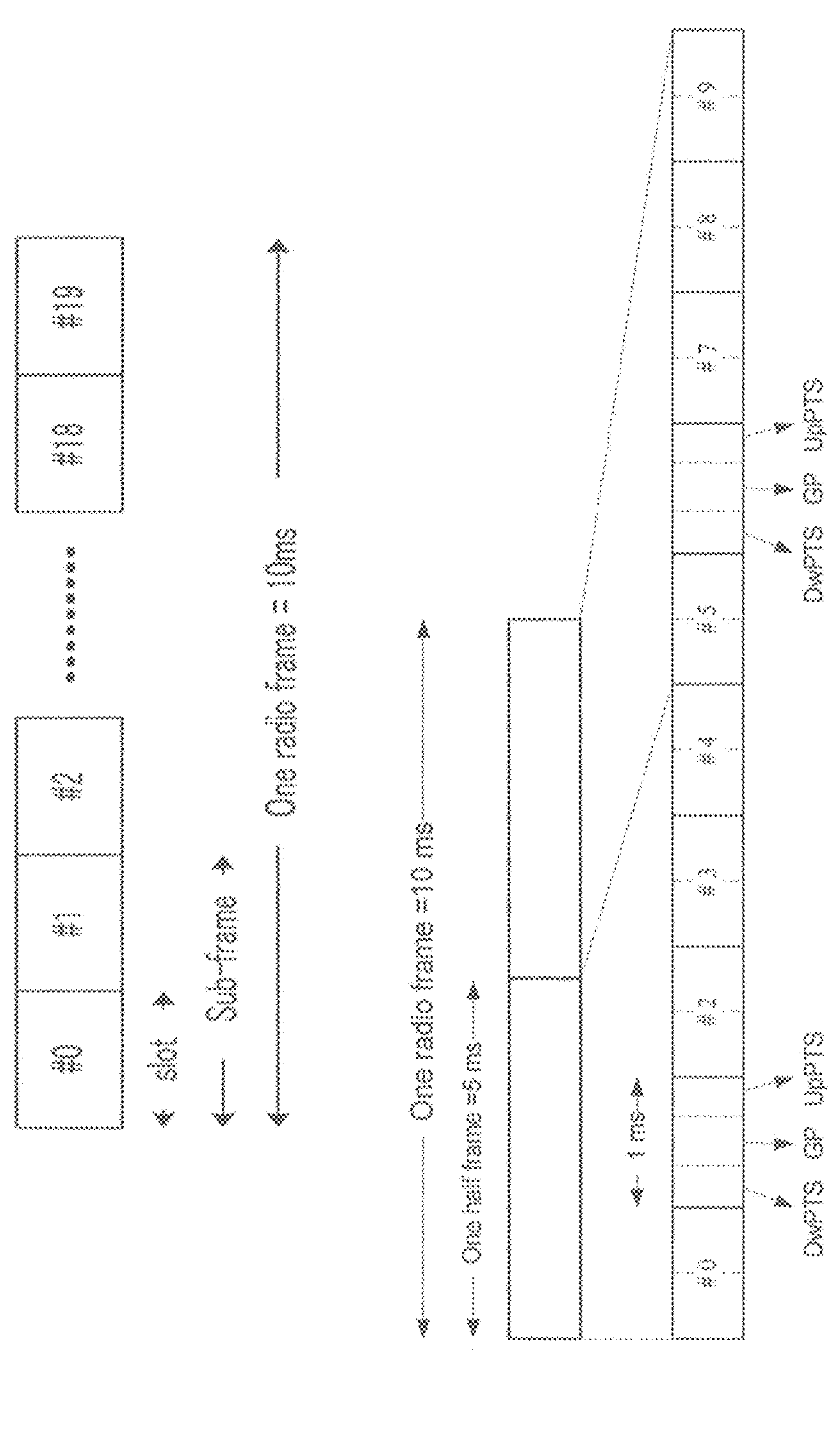
FIG. 3 illustrates an LTE radio frame structure.
FIG. 4 illustrates an example of a Type 2 LTE TDD frame structure.

In accordance with the LTE specification, an LTE radio frame structure, which is illustrated in FIG. 3, comprises a radio frame having a length of 10 ms, with one radio frame consisting of 10 subframes and each subframe consisting of two slots. Besides FDD configurations, the LTE specification also supports TDD configurations, and FIG. 4 illustrates an example of a Type 2 LTE TDD frame structure. The LTE TDD frame structure comprises one radio frame having a radio frame length of 10 ms, with each radio frame consisting of two half-frames, each having a length of 5 ms. Each half-frame consists of five subframes, the first half-frame comprising subframes #0-#4, the second half-frame comprising the subframes #5-#9. Each subframe has a length of 1 ms and in each half-frame the second subframe, i.e., subframe #1 and subframe #6, include downlink pilot time slots, DwPTS, and uplink pilot time slots, UpPTS, separated by a transmission gap guard period, GP. FIG. 5 illustrates a table of allowed TDD radio frame structures in accordance with the LTE specification, more specifically an uplink-downlink configuration for a radio frame structure Type 2 applicable for TDD (see https://3gpp.guru/trts/Rel-18/36300/i20.html #:~:text=36.300). As may be seen from the table in FIG. 5, a subframe of an LTE TDD frame structure may be marked as:

- D denoting a downlink subframe.
- S denoting a special subframe containing the above-mentioned DwPTS and UpPTS separated by the guard period, GP. The GP is used as a guard to switch between downlink and uplink and to avoid that the downlink signals from a neighboring base station cause an interference when trying to decode uplink signals. In cellular telecommunications avoiding interferences is crucial due to the asymmetry in transit power between base stations, BS, and user equipments, UEs. The base station in a cellular system typically transmits with a larger transmit power, e.g., 43 dBm, when compared to UEs, which may transmit with a transmit power of only 20-23 dBm or up to 26 dBm in case of high power UEs. Thus, a high power transmission from a neighboring BS, which is not aligned, causes analog-digital converters, ADCs, to saturate so that a BS may fail to decode a potential uplink signal received from a UE. Therefore, the time alignment between the BS transmitters in a cellular system is an important design criterion.
- U denotes an uplink subframe.
- Subframes #0 and #5 as well as the DwPTS parts of subframes #1 and #6 are reserved for DL transmissions, whereas the UpPTS parts of subframes #1 and #6 and the subframes immediately following a special subframe are reserved for a UL transmission, as may be seen from FIG. 4 and from FIG. 5.

The 5G-NR technology introduces a 5G-NR numerology, which is based on an exponentially scalable sub-carrier spacing for primary synchronization signals, PSS, secondary synchronization signals, SSS, and for the physical broadcast channel, PBCH. FIG. 6 illustrates a table showing the transmission numerologies supported by 5G-NR according to 3GPP TS 38.300. 12 consecutive subcarriers form a physical resource block, PRB, and up to ten 275 PRBs are supported on a carrier. A UE may be configured with one or more bandwidth parts, BWPs, on a given component carrier, of which only one may be active at a time as is described in subclauses 7.8 and 6.10, respectively, or 3GPP TS 38.300. The active bandwidth part defines the operating bandwidth of the UE within the overall operating bandwidth of the cell in which the UE is located. For an initial access and until a configuration of the UE in the cell is received, an initial bandwidth part is used, which is detected from the system information transmitted to the UE.

Downlink and uplink transmissions are organized, as mentioned above, into ten frames with a 10 ms duration, consisting of ten 1 ms subframes. Each frame is divided into two equally-sized half-frames of five subframes each.

The slot duration is 14 symbols with a normal cyclic prefix, CP, and twelve symbols with an extended CP. The slot duration scales in time as a function of the used sub-carrier spacing so that there is an integer number of slots in a subframe.

Figures 7, 8:
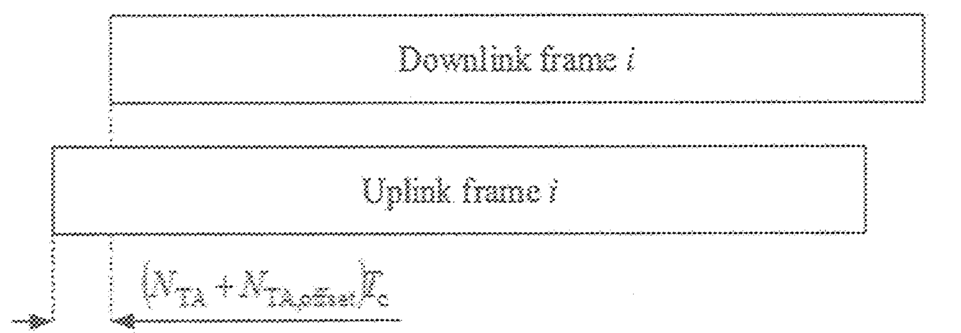
FIG. 7 illustrates an uplink-downlink timing relationship according to 3GPP TS 38.300.
FIG. 8 illustrates a table showing IoT LTE frequency bands according to TS 36.108/TS 36.102.

The timing advance TA, is used to adjust an uplink frame timing relative to a downlink frame timing, as is illustrated in FIG. 7 showing an uplink-downlink timing relationship according to 3GPP TS 38.300. As may be seen, the downlink frame i and the uplink frame i are offset by the timing advance $(N_{TA}+N_{TA,offset})T_c$, as described in 3GPP TS 38.300.

In 5G NR, particularly for NTN and IoT-services, the subcarrier spacing (SCS) may be important with regard to determining the timing of radio frames, subframes, and slots. The SCS directly impacts the numerology used in the network, which, in turn, influences the transmission timings, the frame duration, and how efficiently the system may handle various challenges, such as propagation delay, especially in NTN environments.

In 5G NR, the choice of the SCS significantly impacts the timing of radio frames, which is crucial for specific applications, like NTN-IoT applications. The SCS determines the duration of slots and symbols, thereby directly influencing the system's ability to handle unique challenges of non-terrestrial networks, such as long propagation delays and Doppler shifts. For example, lower SCS values, like 15 kHz and 30 kHz, provide longer slot durations, making them more resilient to higher latency and Doppler effects, which are common in satellite-based systems, for example systems using Geostationary Earth Orbit, GEO, satellites or Medium Earth Orbit, MEO, satellites. The lower SCS configurations may be suitable for IoT applications that prioritize reliability and power efficiency over low-latency. On the other hand, higher SCS values, like 60 kHz or 120 kHz, lead to shorter slot durations, which offer a faster data transmission but are more sensitive to timing errors, so that they may be better suited for low-latency applications in satellite-based systems using Low Earth Orbit, LEO, satellites yielding shorter propagation delays. Thus, selecting an appropriate SCS is important for optimizing a performance of NTN-IoT systems based on the specific deployment scenario and the specific traffic requirements.

In addition, to the above-described LTD TDD frame structure, the LTE specification also defines a narrowband IoT, NB-IoT, frame structure. The NB-IoT TDD frame structure is a frame structure which is introduced for supporting UEs having a very low power class, and which have a reduced complexity. NB-IoT is based on LTE technology and operates in a very narrowband of only 12 subcarriers which is basically the same as one physical resource block, PRB, as used in LTE. With a subcarrier spacing of 15 kHz, this results in a signal occupying only 180 kHz of bandwidth, however, the frame is self-contained, i.e., includes the broadcast channel, a control and/or a data channel, as well as the resources for transmitting a set of reference signals. LTE NB-IoT was standardized in LTE Rel-13. Later, NB-IoT TDD was specified in LTE Rel-17, which only supports a subset of TDD configurations, for example the uplink-downlink configurations 1, 2, 3, 4 and 5, shown in the table in FIG. 5.

In NTN-IoT systems, conventionally the FDD operation is used for enhancing performance and coverage. FDD, which uses separate bands for UL and DL transmissions, improves synchronization and efficiency in satellite-based IoT systems. However, deploying NTN-IoT systems using FDD needs specific enhancements to address challenges such as long RTDs, Doppler shift, and propagation loss inherent to satellite communications.

Key enhancements for an FDD-based NTN-IoT system include an optimization of the timing relationships between the UL and DL transmissions. With large delays associated with satellite links, TA mechanisms need to be refined to account for satellite motion and extended distances for ensuring that devices within the system maintain a robust connectivity without an excessive power consumption or synchronization errors. Additionally, the DL synchronization needs to be improved to manage Doppler shifts caused by satellite movement, particularly in LEO constellations.

Another issue is the resource allocation and bandwidth efficiency on FDD. An efficient spectrum management is essential for maintaining global coverage so that enhancements focus on optimizing the link budget and power efficiency, particularly for battery-constrained IoT devices. The FDD mode allows more reliable and scalable NTN services, especially in scenarios needing continuous and frequent communication, however, it also necessitates the development of adaptive coding and modulation schemes to mitigate signal degradation. The following enhancements for FDD-based NTN-IoT systems are currently discussed:

Timing and frame structure in IoT-NTN FDD: In IoT-NTN FDD, the frame structure may be designed to handle the delay from satellite propagation, which may introduce several hundred milliseconds of latency. The timing of UL and DL transmissions is governed by the timing advance, which compensates for the signal delay caused by the distance between the satellite and the UE. TA ensures that UL transmissions are adjusted so that they arrive at a satellite at the correct time, despite the propagation delay.

Key timing parameters for IoT-NTN in FDD include:

Frame Duration: In 3GPP systems the frame duration is typically 10 ms, broken into 1 ms subframes.

UL/DL Subframes: In FDD, UL and DL transmissions occur continuously on separate bands, meaning that no switching time is needed between UL and DL. However, timing alignment between these two channels is crucial, especially due to the long propagation delays in NTNs.

TA Value: The TA values need to be significantly larger in an NTN compared to a terrestrial network. For LEO satellites, typical RTDs may range from 50 ms to 100 ms, while for GEO satellites, the RTDs may go up to 500 ms or more. The TA needs to be dynamically adjusted based on a satellite's position relative to the UE.

FIG. 8 illustrates a table showing the IoT LTE frequency bands according to TS 36.108/TS 36.102.

When considering NTN-IoT scenarios, power consumption and battery life may be critical areas for optimization. A significant challenge is ensuring an efficient time and frequency synchronization while maintaining a long battery life, which is a key requirement for IoT applications and deployments. In Rel-17, several techniques are explored to address power consumption, particularly in global navigation satellite system, GNSS, enabled devices that operate using eMTC. The enhancements focus on mitigating the energy drain caused by frequent GNSS position fixes and on optimizing uplink transmissions. Separated and integrated GNSS and IoT modules exhibit different power consumption profiles. Devices may include separate modules for GNSS and IoT, like a separate GNSS module and a separate sensing module, while other devices may use a module integrating both, GNSS and IoT operations. Devices using a module integrating both, GNSS and IoT, may consume less power, around 100 mW, when compared to a device using separate modules, which may use about 216 mW. In scenarios where GNSS position fixes are needed before every UL transmission, battery life is reduced by as much as 30-40%. It has been demonstrated that under medium coupling loss, MCL=154 dB, battery life ranged between 6 to 16 years, dependent on the reporting interval and packet size. In addition, the battery performance may improve dependent on how a GNSS module is started for performing GNSS position fixes. When the GNSS module is subjected to a hot-start (1-2 seconds), the power consumption is reduced when compared to a warm-start (5 seconds).

NTN-IoT approaches may be further enhanced by one or more of the following:

Timing Relationship Optimization: Enhancements to timing relationships, like the timing relationship between the narrowband physical downlink control channel, NPDCCH, and the narrowband physical uplink share channel, NPUSCH, and the timing relationship for HARQ feedback processes, may reduce power consumption by optimizing when UEs monitor the NPDCCH after a transmission. For instance, reducing the need for a continuous NPDCCH monitoring may save significant energy in idle modes. Additionally, TDD frame structures may be applied to better manage the UL/DL switching in the presence of large roundtrip delays, RTDs, caused by satellite propagation. The frame structure may be designed to allocate specific time windows for uplink and downlink transmissions, thereby ensuring that Timing Advance, TA, values compensate for long transmission delays, thereby improving the synchronization between a UE and a satellite.

Segmented Uplink Pre-Compensation: Long UL transmissions may need a pre-compensation for a satellite delay and for a Doppler shift. Techniques, such as a segmented pre-compensation, applied over N time units, may reduce phase discontinuities and signal drift during long transmissions. This segmented approach may adjust frequency offsets in blocks, thereby ensuring that signals maintain a coherence over extended transmission periods. An integration of TDD frame structures further supports uplink pre-compensation by separating uplink and downlink phases, supporting the handling of high TA values without impacting synchronization and link quality.

Battery Life Mitigation Techniques: For fixed IoT sensors or applications where the GNSS position is available at the application layer, the GNSS impact on power consumption is negligible. On the other hand, for mobile devices, like mobile IoTs or UEs, an advanced synchronization technique, such as connected-mode DRX and GNSS fixes only for sporadic transmissions may reduce energy consumption by 34% to 45%. In TDD frame structures, the UL/DL switching intervals ensure that a UE remains in low-power mode during inactive periods, thereby further extending battery life. By adjusting the frame timing to match a satellite's orbit and the UE's location, power consumption may be efficiently managed during periods of extended inactivity.

The above advancements aim to enable NTN-IoT devices to operate efficiently in scenarios with long transmission intervals, high satellite delays, and harsh environmental conditions, while preserving battery life for operation. By leveraging TDD frame structures and optimizing the timing and frequency relationships with proper TA adjustments, NTN-IoT-devices or systems may achieve enhanced synchronization, power efficiency and battery life.

It has been found that the above enhancements for IoT-NTN systems by operating according to TDD or HDFDD (instead of FDD) also present significant opportunities for enhancing performance and coverage when operating NB-IoT devices in terrestrial or non-terrestrial networks, especially, any regarding the timing relationships between the uplink/downlink transmissions are avoided.

Embodiments of the present invention provide a new NB-IoT approach using, for example, an existing LEO constellation for providing true global coverage and completing terrestrial coverage offered by mobile network operators, MNOs, worldwide. Embodiments of the present invention provide several enhancements for implementing such an NB-IoT NTN service which include, for example, further improvements for IoT-NTN in duplex mode operation, enhancements in network energy savings and a new half-duplex operation in unpaired spectrum. Further, embodiments provide a new reference scenario, different from the one described, for example, in TR 36.763. Embodiments of the present invention need only limited changes to an existing NB-IoT approach, while, at the same time, yielding significant benefits as in the IoT-NTN system. In accordance with the inventive approach, which is described in more detail in the following, an improved NB-IoT operation in the TDD mode is enabled in TN and NTN systems.

Figure 9A:
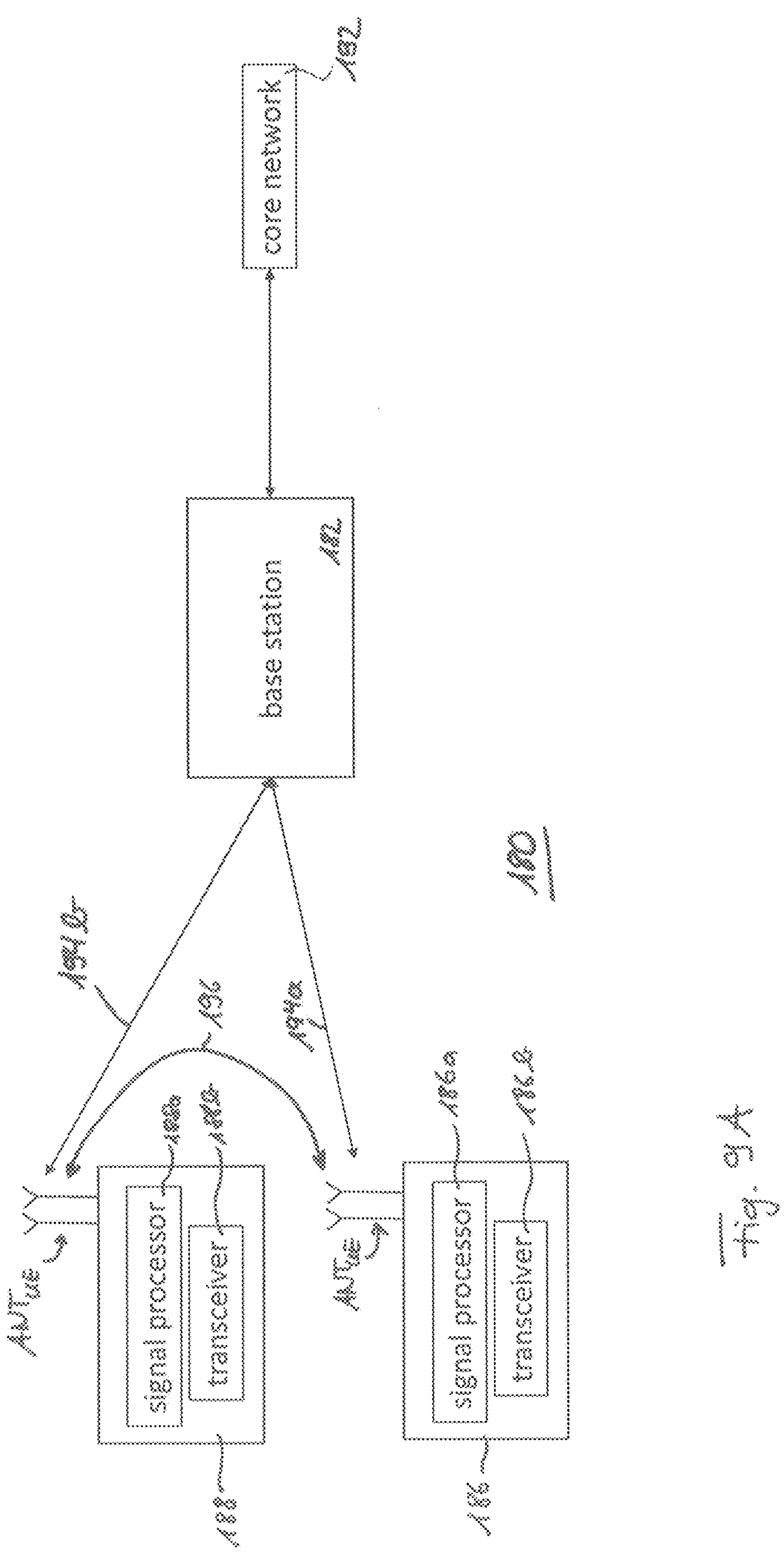
FIG. 9A to FIG. 9C are schematic representations of terrestrial and non-terrestrial wireless communication systems or networks including a transmitter, like a base station, and one or more receivers, like user devices, UEs, or IoT devices, for implementing embodiments of the present invention.
Figure 9B:
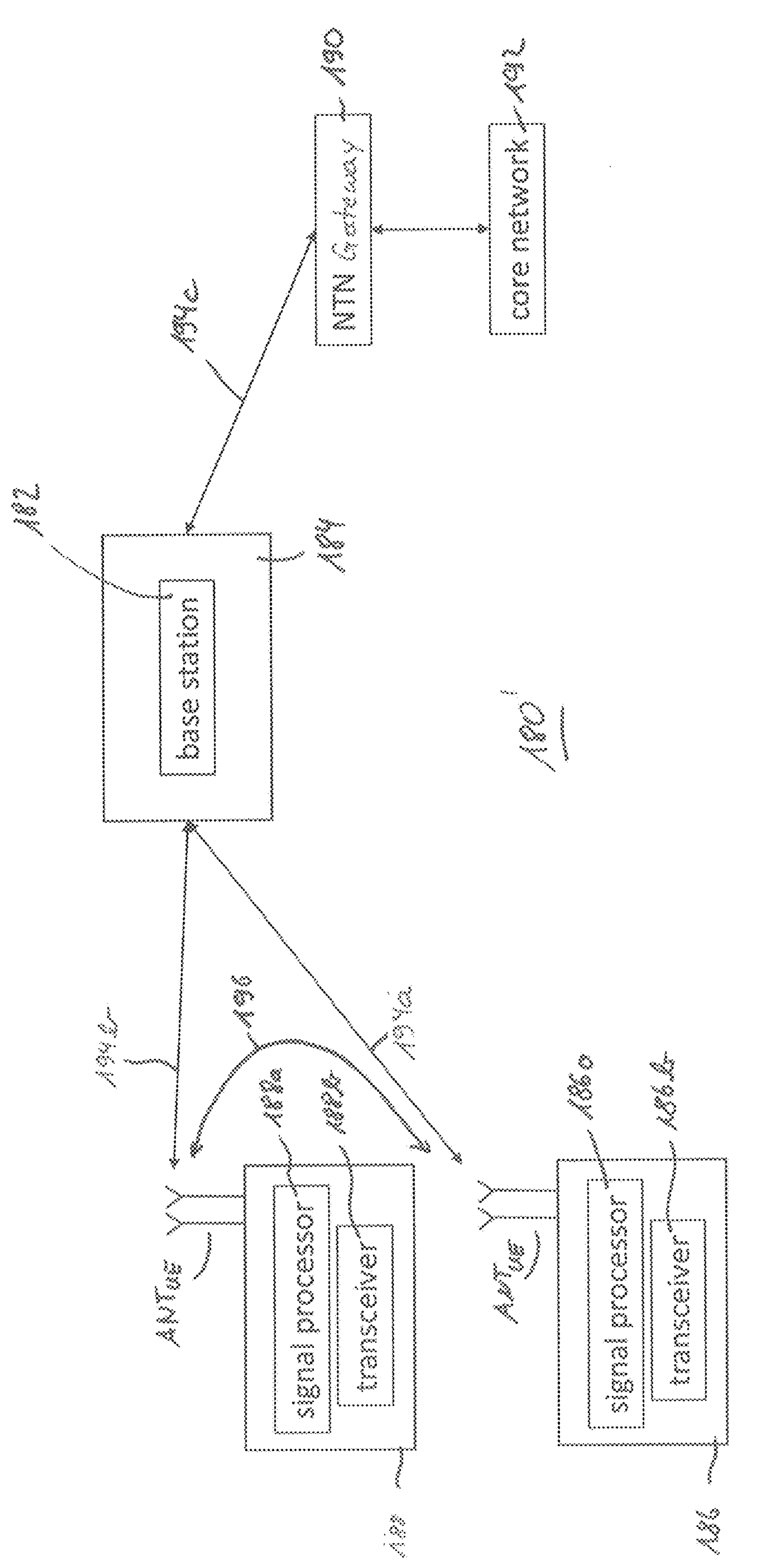

Embodiments of the present invention may be implemented in a network or system as described above with reference to FIG. 1A, FIG. 1B and FIG. 2. FIG. 9A, FIG. 9B and in FIG. 9C are a schematic representations of wireless communication systems for implementing the inventive approach.

FIG. 9A is a schematic representation of a terrestrial wireless communication system 180 including a transmitter 182, like a base station, and one or more receivers 186, 188, like user devices, UEs. The transmitter 182 is located on the ground and is connected to the receivers 186, 188 and to the core network 192. The transmitter 182 may communicate with the receivers 186, 188 via one or more wireless communication links or channels 194*a*, 194*b*, like a radio link. The transmitter 182 may include one or more antennas $ANT_T$ or an antenna array having a plurality of antenna elements, a signal processor and a transceiver, coupled with each other. The receivers 186, 188 include one or more antennas $ANT_{UE}$ or an antenna array having a plurality of antennas, a signal processor 186*a*, 188*a*, and a transceiver 186*b*, 188*b* coupled with each other. The base station 182 and the UEs 186, 188 may communicate using a first interface, like the Uu interface, while the UEs 186, 188 may also communicate with each other via a wireless communication link 196, like a radio link, using a second interface, e.g., the PC5 or sidelink, SL, interface. When the UEs are not served by the base station or are not connected to the base station, for example, they are not in an RRC connected state, or, more generally, when no SL resource allocation configuration or assistance is provided by a base station, the UEs may communicate with each other over the sidelink. The base station 182 and the one or more UEs 186, 188 of FIG. 9A may operate in accordance with the inventive teachings described herein.

FIG. 9B is a schematic representation of a non-terrestrial wireless communication system 180' including a transmitter 182, like a base station, included in a NTN component 184, like a satellite. The NTN component operates in accordance with the so called regenerative principle, i.e., base station functionality is provided by the NTN component, which may use on-board processing so that a signal is demodulated, decoded, re-encoded and modulated aboard the NTN component. The base station functionality may be provided in the NTN component. The wireless communication system 180' further includes one or more receivers 186, 188, like user devices, UEs or IoT devices, and a gateway 190 connected to a core network 192. The transmitter 182 and the receivers 186, 184 may communicate via one or more wireless communication links or channels 194*a*, 194*b*, like a radio link or service link, provided by the satellite 184. The transmitter 182 and the NTN gateway 190 may communicate via one or more further wireless communication links or channels 194*c*, like a radio link or feeder link, provided by the satellite 184. The transmitter 182 includes a signal processor and a transceiver, coupled with each other, and uses for the communication with the receivers 186, 188 and with the NTN gateway 190 one or more antennas $ANT_T$ or an antenna array having a plurality of antenna elements of the satellite 184. The receivers 186, 188 include one or more antennas $ANT_{UE}$ or an antenna array having a plurality of antennas, a signal processor 186*a*, 188*a*, and a transceiver 186*b*, 188*b* coupled with each other. The base station 182 and the UEs 186, 188 may communicate using a first interface, like the Uu interface, while the UEs 186, 188 may also communicate with each other via a further wireless communication link 196, like a radio link, using a second interface, like the PC5 or sidelink, SL, interface. For example, when the UEs are not served by the base station or are not connected to the base station, for example, they are not in an RRC connected state, or, more generally, when no SL resource allocation configuration or assistance is provided by a base station, the UEs may communicate with each other over the sidelink. The base station 182, the NTN component 184, and the one or more UEs 186, 188 of FIG. 9B may operate in accordance with the inventive teachings described herein.

Figure 9C:
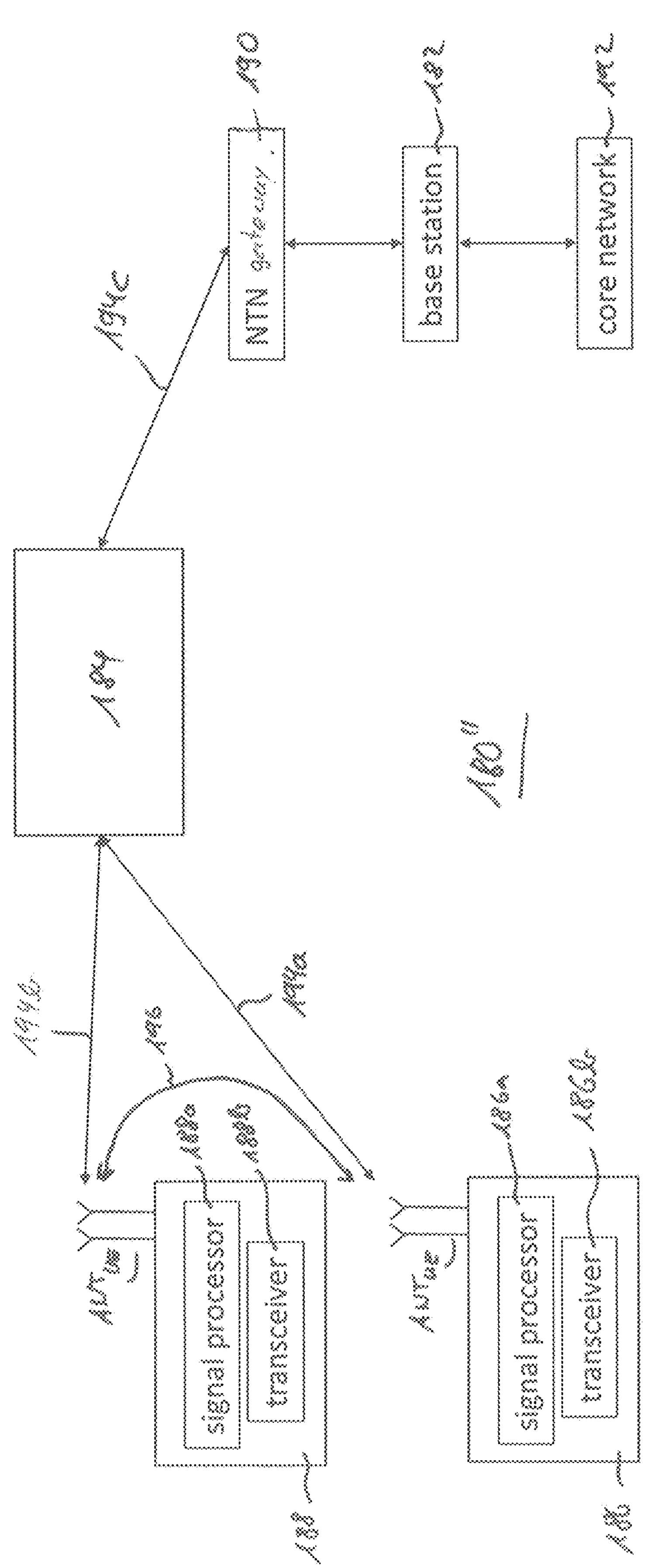

FIG. 9C is a schematic representation of a further non-terrestrial wireless communication system 180" which differs from the wireless communication system 180' of FIG. 9B in that the transmitter 182, like the base station, is not included in the NTN component 184, like the satellite, but on the ground. The NTN component operates in accordance with the so-called bent pipe or u-bent principle, i.e., base station functionality is provided external of the NTN component, and the satellite sends back to earth what goes into the conduit with only amplification and a shift from uplink to downlink frequencies at the NTN component. The wireless communication system 180" further includes the one or more receivers 186, 188, like user devices, UEs or IoT devices, and the gateway 190 connected via the base station 182 to a core network 192. The base station may also be part of the NTN gateway. The transmitter 182 and the receivers 186, 184 may communicate via one or more wireless communication links or channels provided by the NTN component 184, e.g., the radio link or service link 194*a*, 194*b* and the radio link or feeder link 194*c*. The base station 182, the NTN component 184, and the one or more UEs 186, 188 of FIG. 9C may operate in accordance with the inventive teachings described herein.

The present invention provides a user device, UE, for a wireless communication system,

- wherein the UE is to communicate with one or more radio devices using a radio signal comprising a plurality of time blocks in a time domain,
- wherein the radio signal comprises
  - a plurality of time blocks used for a communication between the UE and the one or more radio devices, and
  - one or more additional time blocks not used for a communication between the UE and the one or more radio devices, and
- wherein the UE is to communicate with one or more of the radio devices using two or more of the time blocks, the two or more time blocks being offset by at least one of the additional time blocks of the radio signal.

In accordance with embodiments,

- the one or more radio devices comprise at least one non-terrestrial network (NTN) entity, and the UE is an Internet-of-Things (IoT) device operating in time division duplex (TDD) mode in an IoT-NTN TDD band, e.g., at 1616-1626.5 MHz,
- uplink (UL) and downlink (DL) transmissions are separated in the radio signal in a time domain, the radio signal having a frame structure, like a frame structure type 1, with a frame duration of 10 ms and 10 subframes per frame, and
- the plurality of time blocks comprises a set of D non-overlapping consecutive or usable contiguous DL subframes and a set of U consecutive or usable contiguous UL subframes, and wherein the one or more additional time blocks defined a fixed guard period (GP) separating the consecutive or contiguous DL subframes and the consecutive or contiguous UL subframes.

In accordance with embodiments, a pattern of contiguous DL subframes, GP and contiguous UL subframes is repeated every N radio frames.

In accordance with embodiments,

- the one or more radio devices comprise at least one non-terrestrial network (NTN) entity, and the UE operates in a NTN time division duplex (TDD) mode in a TDD band, e.g., in TDD band 249, and
- the radio signal has a frame structure, like a frame structure type 1, with a frame duration of 10 ms and 10 subframes per frame, and at an uplink time synchronization reference point, the frame structure comprises D, e.g., 8, contiguous or consecutive downlink (DL) subframes, followed by G1, e.g., 50, contiguous or consecutive guard period (GP) subframes, followed by U, e.g., 8, contiguous or consecutive uplink (UL) subframes, followed by G2, e.g., 24, contiguous or consecutive guard period (GP) subframes.

In accordance with embodiments, each radio frame is $T_f=307200T_s=10$ ms long and consists of 10 subframes of length $30720T_s=1$ ms, numbered from 0 to 9, with subframe i in frame $n_f$ having an absolute subframe number $$n_{sf}^{abs} = 10n_f + i,$$

where $n_f$ is a system frame number.

In accordance with embodiments, the pattern of the D consecutive DL subframes, followed by the G1 consecutive GP subframes, followed by the U consecutive UL subframes, followed by the G2 consecutive GP subframes, is repeated at a predefined interval, e.g., each 90 ms.

In accordance with embodiments, D=8, G1=50, U=8, and G2=24, and

- the UE does not assume any signal or channel to be transmitted to the UE in subframes other than in DL subframes 3, 4, 5, 6, 7, 8, 9, and 0 across two consecutive radio frames, and
- the UE does not transmit any signal or channel on a subframe other than the 8 consecutive UL subframes.

In accordance with embodiments,

- the UE fully transmits a preamble repetition unit within the U consecutive UL subframes of the predefined interval, like a 90 ms interval, and
- the UE postpones a transmission of a preamble repetition unit that is partially or not within the U consecutive UL until the U consecutive UL subframes of the next predefined interval.

In accordance with embodiments, a periodicity of a predefined control signaling which is less than the predefined interval, is mapped to a periodicity avoiding the predefined control signaling to fall into the GP, and the predefined control signaling may comprise:

- an access signaling, like a PRACH or NPRACH periodicity of 40 ms being mapped to a 90 ms periodicity, or a PRACH or NPRACH periodicity of 80 ms being mapped to a 180 ms periodicity, or
- a DL control signaling, like a PDCCH or NPDCCH having a monitoring periodicity increased in order to match the predefined interval, e.g., by using monitoring values of 45 ms or 90 ms instead of 4 or 8 milliseconds.

In accordance with embodiments, when the UE is located in a NTN TDD serving cell and determines a subframe not being one of the D contiguous or consecutive DL subframes, the UE assumes the subframe to be no narrowband (NB) IoT (NB-IoT) DL subframe.

In accordance with embodiments,

- the UE does not assume any downlink physical signal or physical channel to be present in any subframe other than within the D contiguous or consecutive DL subframes, and
- the UE does not transmit any uplink physical signal or physical channel in any subframe other than within the U contiguous or consecutive UL subframes.

In accordance with embodiments, a DL transmission of control and/or data or of broadcast information, e.g., system information, SI, such as a system information block, SIB, is skipped or deferred, when the transmission overlaps with a part of the frame not used for a DL transmission, like an UL subframe or the GP.

In accordance with embodiments, the DL transmission is deferred to a next possible DL transmission opportunity.

In accordance with embodiments, in case the UE is to operate in the IoT NTN TDD mode and an uplink-downlink subframe timing is not aligned within a NTN gNB, the UE receives from the gNB a signaling of a scheduling offset, e.g., k-Mac.

In accordance with embodiments, a time block comprises one or more of the following:

- a slot,
- a subframe,
- a radioframe, e.g., having a length of 10 ms,
- a half-frame, e.g., having a length of 5 ms,
- a hyperframe, e.g., containing one or more slots, subframes, radioframes, or half-frames.

In accordance with embodiments, an additional time block comprises one or more of the following:

- a slot,
- a subframe,
- a radioframe, e.g., having a length of 10 ms,
- a half-frame, e.g., having a length of 5 ms,
- a hyperframe, e.g., containing one or more slots, subframes, radioframes, or half-frames.

In accordance with embodiments, a time block and an additional time block have

- the same length, or
- a different length, with
  - a time block being larger than an additional time block, or
  - a time block being shorter than an additional time block.

In accordance with embodiments, the UE is to estimate an offset of the two or more time blocks.

In accordance with embodiments, the UE is to estimate the offset using/dependent on one or more of the following:

- an energy detection of a signaling received on one of a plurality of time blocks, e.g., a peak detection, like a sequence detection by correlation,
- a prediction pattern, e.g., based on an AI-ML model trained on past receptions,
- indirect process, e.g., by decoding of signals received from one or more further UEs, e.g., which are transmitting to the one or more of the radio devices.

In accordance with embodiments, the UE is configured or preconfigured with the offset, e.g., using a signaling from the wireless communication system.

In accordance with embodiments, the offset has a minimum or maximum value, e.g., based on a configured or preconfigured value or threshold.

In accordance with embodiments, the offset value is configured per UE or for a group of UEs, e.g., a group containing one or more further UEs.

In accordance with embodiments, the offset is defined by a configured or preconfigured periodicity or by a configured or preconfigured pattern, e.g., a bitmap or vector.

In accordance with embodiments, wherein the offset value is defined by a previous offset value, the previous offset value being one of:

- greater than the previous value
- greater than or equal to the previous value,
- smaller than the previous value,
- smaller than or equal to the previous value.

In accordance with embodiments, the periodicity indicates one or more periods P with which the time blocks occur.

In accordance with embodiments, the periodicity indicates a certain period P with which the time blocks occur, with P being an integer >1 and every $P^{th}$ time block of the radio signal being a first time block.

In accordance with embodiments, the time blocks comprise N1 first time blocks and N2 second time blocks, with N1, N2 being integers >0, and with N1=N2 or N1<N2 or N1>N2, and the UE is to use the first time blocks according to a first period P1 and the second time blocks according to a second period P2, with P1, P2 being an integers >1, and with P1=P2 or P1<P2 or P1>P2.

In accordance with embodiments, the one or more periods P are selected dependent on or more of the following:

- a load in the wireless communication system, e.g., a shorter period is selected for non-bursty traffic, like a transmission or reporting of a measurement value, than for bursty traffic, like over-the-air firmware updates or configurations, e.g., for one or more or a large amount of devices,
- delay or latency requirements, e.g., a shorter period is selected for traffic with higher latency requirements than for traffic with low latency requirements,
- a number of users in the wireless communication system, e.g., a shorter period is selected for a first number of IoT devices than for a second number of IoT devices which is lower than the first number,
- a position of the radio device, e.g., a shorter period is selected for a radio device is located in a densely populated geo-location, like a city, than for a radio device is located in a sparsely geo-location, like a countryside,
- a power budget of the radio device, e.g., a shorter period is selected for a radio device having a remaining battery power or a used power within a certain time period above a predefined threshold than for a radio device having a remaining battery power or used power within a certain time period below the predefined threshold,
- a power budget of the user device, e.g.,
  - a larger period for a user device being low on power, in order to perform power saving and being able to perform transmission for a maximum time, or
  - a smaller period for a user device being low on power, in order to perform an urgent transmission before the user device runs out of power, e.g., in case the power is drained by a certain number of receptions and/or transmissions.
- a service used by the radio device, e.g., a 3GPP IoT service, a disaster services, like a public protection disaster relieve, PPDR,
- 3GPP device types, e.g., normal NR or eMBB UEs, NB-IoT, eMTC, NR, NR-NTN, IoT-NTN, RedCap, A-IoT, where the period is selected according to the processing capabilities of the particular device, e.g.,
  - NB-IoT having a larger period due to the slower processing capabilities,
  - eMTC having a shorter period, due to the higher processing capabilities,
- 3GPP devices may be preferred wrt. non-3GPP devices, thus having a shorter period, or vice versa,
- non-3GPP services, e.g., positioning services, like GPS, or data and/or communication services using a satellite communication technology, e.g., based on Iridium satellite services, where the period may be
  - shorter, in case of a higher precision in a positioning requirement,
  - larger, in case of a lower prediction in a positioning requirement.

In accordance with embodiments, the time blocks comprise N1 first time blocks and N2 second time blocks, with N1, N2 being integers >0, and with N1=N2 or N1<N2 or N1>N2, and wherein the UE is to use the first time blocks according to a first pattern and the second number of first time blocks according to a second pattern, with the first pattern and the second pattern being the same or different.

In accordance with embodiments, the configured or pre-configured pattern defines one or more of the following:

- a periodic pattern, e.g., with a fixed period n,
- a burst pattern, e.g., consisting of m consecutive time blocks or consisting of m consecutive time blocks separated by one or more additional time blocks not used for communication between the UE and the one or more radio devices,
- a pattern based on a service requirement of a UE, e.g., adopted to one or more of the following:
  - a low delay service requirement, e.g., having a shorter period,
  - a best-effort service requirement, e.g., having a larger delay,
- a pattern according to a service requirement of the radio device, e.g.,
  - a low delay service requirement, e.g., having a shorter period,
  - a best-effort service requirement, e.g., having a larger delay,
- a handover pattern, e.g., in case a UE is currently performing a random access, e.g., PRACH or is about to perform a PRACH, the pattern may be adopted accordingly, e.g., using a pattern having more time slots, so
  - that the random access process may be performed faster or
  - that the probability of a successful random access may be increased,
- a measurement pattern, e.g., in case the radio device needs faster feedback information from the said UE, the pattern may be adopted to allow more measurement time slots=more time slots within the pattern, or vice versa.

Thus, for the PRACH or NPRACH periodicity, for IoT NTN TDD mode, certain periodicities may not be supported, since they would fall into a guard period. Thus, periodicities which are less than 90 milliseconds, may be mapped to higher periodicities. In this case, a NPRACH periodicity of 40 milliseconds may be mapped to a 90 millisecond periodicity, a periodicity of 80 milliseconds may be mapped to a 180 millisecond periodicity.

Furthermore, the NPDCCH monitoring periodicity may be increased, in order to match the 90 millisecond cycle. E.g., the monitoring values can support value of 45 ms or 90 ms, instead of 4 or 8 milliseconds, e.g., G={11.25*4, 11.25*8}.

In accordance with embodiments, the UE is to use a time block for receiving a downlink, DL, transmission from the radio device and/or for transmitting an uplink, UL, transmission to the radio device.

In accordance with embodiments, the UE is to use N1 first time blocks for receiving a downlink, DL, transmission from the radio device and a N2 second time blocks for transmitting an uplink, UL, transmission to the radio device, with N1, N2 being integers >0, and with N1=N2 or N1<N2 or N1>N2.

In accordance with embodiments, one or more of the first time blocks trigger one or more of the second time blocks.

In accordance with embodiments, one the first time blocks triggers one of the second time blocks.

In accordance with embodiments, the second time block includes an UL transmission associated with a DL transmission in the first time block.

In accordance with embodiments, two or more of the first time blocks trigger one of the second first time blocks.

In accordance with embodiments, the one second time block includes an UL transmission associated with DL transmissions in the first time blocks.

In accordance with embodiments, one of the first time blocks triggers two or more of the second time blocks.

In accordance with embodiments, wherein the second time blocks includes UL transmissions associated with a DL transmission in the one first time block.

In accordance with embodiments, the downlink transmissions by the radio device comprise one or more of the following:

- a transmission of one or more broadcast signals, e.g., containing one or more of the following:
  - master information block, MIB, e.g., containing essential information about the physical layer configuration of the cell, including the cell ID, bandwidth, subcarrier spacing, and frame structure, etc.,
  - system information block, SIB, carrying specific information such as cell-specific parameters, neighbor cell information, mobility management, and radio resource control parameters,
- a transmission of one or more synchronization signals, e.g.,
  - multiple SSBs within a shorter time frame in order to receive the corresponding feedback from the UEs with respect to the desired spot-beams,
  - a part of a synchronization signal, e.g., a primary synchronization signal, PSS only, or a secondary synchronization signal, SSS only,
- a transmission of one or more positioning reference signals (PRS) or sounding signals, e.g., sounding reference signals, SRS, where these signals may be used for integrated communication and sensing, ICAS,
- a transmission of one or more unicast signals, e.g., signals having a high priority, like signals of premium services, or a signal addressed to a single UE only, e.g., wrt. a UE identifier,
- a transmission of one or more groupcast or multicast signals, e.g., wake-up signals for a group of IoT devices
- a transmission concerning a retransmission, e.g., transmitted via Physical Hybrid ARQ Indicator Channel (PHICH).

In accordance with embodiments, in case a certain signal is received within a time block and/or within an additional time block, the UE is to trigger one or more predefined events or activate one or more second time blocks to be used for the communication.

In accordance with embodiments, the certain signal comprises one or more of the following:

- a control signal, e.g., PDCCH, or control embedded into the data channel, e.g., PDSCH, or control contained within the downlink broadcast channel, PBCH,
- a request for data, e.g., a scheduling assignment to transmit data in the uplink,
- a request for control, e.g., a scheduling assignment to transmit control in the uplink, e.g., the control comprising one or more of the following:
  - RRC, e.g., a radio resource control message, e.g., a RRC-handshake,
  - MAC-CE, e.g., a transmission of a MAC control element,
  - Physical layer, PHY, control, e.g., contained within a downlink control information, DCI, or an uplink control information, UCI,
- a measurement request, e.g., for one or more of the following:
  - transmitting a feedback information in the uplink, e.g., channel state information, CSI, such as a channel quality indicator, CQI, or a preferred matrix index, PMI, or a rank indicator, CQI,
  - transmitting a position-related information, e.g., containing a geo-location, e.g., a GPS position,
- a HARQ information or retransmission request, e.g., an acknowledgement message, ACK or a negative ACK, NACK, e.g., transmitted via physical hybrid ARQ indicator channel, PCFICH,
- transmission of a position reference symbol, PRS,
- a synchronization signal, e.g., PSS and/or SSS, e.g., which may trigger a random access.

In accordance with embodiments, the one or more predefined events comprise one or more of the following:

- a particular time block pattern is activated and/or deactivated,
- all time blocks are deactivated until a certain time window or event,
- a burst pattern is activated or deactivated,
- a particular time block pattern or burst pattern is activated within a certain offset in the time domain or in a frequency domain,
- a periodicity of time blocks is changed, e.g.,
  - the periodicity is increased,
  - the periodicity is decreased,
  - the periodicity is modified within a time offset, e.g., in x time blocks,
- one or more time blocks are skipped, e.g., depending on a criterion like
  - a length of a previous activation period, e.g., a previous activation period may have been
    - too short for a transmission requirement of the UE, so that the said UE needs more future slots for a successful transmission of the said data, or
    - long enough, so that a transmission of data was successful and that the said UE may send a scheduling request, SR, for future transmission, e.g., in case it has data to transmit.

In accordance with embodiments, a reference to the one or more second time blocks is signaled within a time block.

In accordance with embodiments, the one or more further time blocks are used to transmit one or more of the following:

- broadcast information, e.g., MIBs/SIBs, a PBCH,
- a control channel, e.g., a PDCCH by transmitting DCIs or UCIs, or PCFICH, or PHICH,
- a data channel, e.g., a PDSCH, which may be used to transmit control, e.g., RRC IE, or data,
- satellite-specific control information, e.g., information which is only used for satellite systems, e.g., Ephemeris data, or special timing advance, TA, configurations, which adhere to the long delay of satellites, e.g., LEO, MEO or GEO satellites, when compared to terrestrial communication systems, TN, or a spot beam identifier, e.g., related to a beam formed by the radio device, e.g., a spot beam formed by the satellite.

In accordance with embodiments, the plurality of time blocks of the radio signal use a first carrier, e.g., a first frequency range, and wherein the radio signal comprises a second plurality of time blocks in a time domain using a second carrier, e.g., a second frequency range.

In accordance with embodiments, the first and the second carrier are separated by a configured or preconfigured frequency range, e.g., at least a 10 MHz carrier or at least a 180 kHz carrier, which is the NB-IoT carrier bandwidth.

In accordance with embodiments, the time blocks on the second carrier are signaled an anchor carrier, like the first carrier, indicating that the time blocks using the first and second carriers have an identical or different offsets.

In accordance with embodiments, the UE is configured or preconfigured with a first channel including the radio signal and with a second channel including a second radio signal, the second radio signal comprising a plurality of time blocks used for a communication between the UE and the one or more radio devices, and one or more additional time blocks not used for a communication between the UE and the one or more radio devices.

In accordance with embodiments, the plurality of time blocks of the radio signal and the plurality of time blocks of the second radio signal are configured with the same radio signal structure or with different radio signal structures.

In accordance with embodiments, the first channel is for a communication with a first radio device, and the second channel is for a communication with a second radio device.

In accordance with embodiments, the UE is to use the first channel and/or the second channel dependent on one or more criteria, e.g., known positions of the radio device so that the UE transmits and/or receives form a radio device via at least one of the first and second channels.

In accordance with embodiments, the time block comprises one or more of the following:

- a radioframe or frame, e.g., a 10 ms frame,
- a certain number of radioframes of frames, e.g., a certain number of consecutive radioframes or frames, e.g., a group of radioframes, which may be denoted as hyperframe,
- a half-frame, e.g., a radioframe or frame composed of 2 half-frames,
- a subframe, e.g., a radioframe may be composed of 10 subframes,
- a slot, e.g., a subframe may be composed of 2 slots.

In accordance with embodiments, time block is configured with a particular Time Division Duplex, TDD, pattern.

In accordance with embodiments, the particular TDD pattern is a pattern defined for Narrowband Internet of Things, NB-IoT, devices, e.g., a LTE NB-IoT frame structure having 180 kHz bandwidth by using 12 subcarriers or one physical resource block, PRB, with a subcarrier spacing of 15 kHz.

In accordance with embodiments, the time block is a frame having a duration of 10 ms, the frame including two half-frames, each half-frame having a duration of 5 ms subframes, and each half-frame including five subframes, each subframe having a duration of 1 ms.

In accordance with embodiments, the time block is configured with a particular duplex pattern, e.g., a TDD pattern, having one of the following configurations:

| | time blocks (e.g., subframes or slots or half frames or frames or hyperframes | | | | | | | | | |
|---|---|---|---|---|---|---|---|---|---|---|
| Configuration | #0 | #1 | #2 | #3 | #4 | #5 | #6 | #7 | #8 | #9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |
| 7 | D | D | D | D | D | D | D | D | D | D |
| 8 | U | U | U | U | U | U | U | U | U | U |
| 9 | D | D | D | D | D | S | U | U | U | U |
| 10 | U | U | U | U | U | D | D | D | D | D |

with

- D denoting time blocks to be used for a downlink transmission,
- U denoting time blocks to be used for an uplink transmission, and
- S denoting special time blocks to be used for switching between downlink and uplink transmissions, or with

- D denoting time blocks to be used for a downlink transmission,
- U denoting time blocks to be neglected and not used for any transmission, or time blocks to be used for a downlink transmission, and
- S denoting time blocks to be neglected and not used for any transmission, or to be used for a downlink transmission, or with

- D denoting time blocks to be neglected and not used for any transmission, or time blocks to be used for an uplink transmission,
- U denoting time blocks to be used for an uplink transmission, and
- S denoting time blocks to be neglected and not used for any transmission, or to be used for an uplink transmission.

In accordance with embodiments, the TDD pattern contains any combination of any of D, U, and/or S time blocks.

In accordance with embodiments, the UE is to select one of the duplex pattern, e.g., TDD configurations, dependent on one or more criteria.

In accordance with embodiments, the one or more criteria comprise one or more of the following:

- a condition of the wireless communication system,
- a transmission in a downlink part of the frame.

In accordance with embodiments, the condition of the wireless communication system comprises one or more of the following:

- a load in the wireless communication system, e.g., in case of a higher load in the downlink, a duplex configuration with more D subframes/frames/slots/half-frames are configured, vice versa for the uplink,

- delay or latency requirements, e.g., in case of a latency requirement with requirements of downlink and uplink transmission, a duplex pattern may be chosen that allows switching between downlink and uplink slots, and vice versa,
- a number of users, e.g., IoT devices, in the wireless communication system,
- a position of the radio device,
- a power budget of the radio device, e.g., in case of low battery power, certain time instances in the duplex configuration may be neglected,
- a radio condition, e.g., pathloss or interference or signal a quality (SNR, SINR, rank, RSSI, RSRP, RSRQ) or delay spread,
- a service used by the radio device,
- a 3GPP services,
- a non-3GPP service, e.g., in case of other technology operating in the same frequency band, a pattern having guard band, e.g., S slots or neglected slots may be configured, such that interference between these systems is reduced or avoided, e.g., to allow coexistence between 3GPP and non-3GPP devices.

In accordance with embodiments, the transmission in the downlink part of the frame comprises one or more of the following:

- a transmission of broadcast information, e.g., a Narrowband Physical Broadcast Channel, NPBCH,
- a transmission of a primary or secondary synchronization signal, e.g., a Narrowband Primary Synchronization Signal, NPSS, or a Narrowband Secondary Synchronization Signal, NSSS,
- a transmission of a control channel, e.g., a Narrowband Physical Downlink Control Channel, NPDCCH,
- a transmission of a data signal, e.g., a Narrowband Physical Downlink Shared Channel, NPDSCH,
- a transmission of a reference signal, e.g., a downlink or cell-specific reference signals, CRS, or a narrowband reference signal, NRS.

It is noted that the transmission of control and/or data or of a broadcast information, e.g., system information, SI, such as a system information block, SIB, may be deferred or postponed, due to the adapted frame structure. This may be the case if the transmission of a SI message overlaps with a symbol type having a different link direction, e.g., an uplink symbol or subframe U or a flexible symbol, which is not used for a downlink transmission. In this case, the transmission of a SI message may be skipped or deferred to the next possible transmission opportunity of a downlink symbol, D, e.g., the next valid D subframe.

In case the uplink—downlink frame timing is not aligned within the NTN gNB, the gNB may signal a scheduling offset, e.g., k-Mac, in case the IoT NTN TDD mode is configured.

In accordance with embodiments, any of the duplex patterns is selected containing at least one downlink, D, symbol/slot/subframe/frame/half-frame/hyperframe.

In accordance with embodiments, the transmission in the uplink part of the frame comprises one or more of the following:

- a transmission of a control channel, e.g., a Narrowband Physical Uplink Control Channel, NPUCCH,
- a transmission of a data signal, e.g., a Narrowband Physical Uplink Shared Channel, NPUSCH.
- a physical random access channel, e.g., a Narrowband Physical Random Access Channel, NPRACH.

In accordance with embodiments, any of the duplex patterns is selected containing at least one uplink, U, symbol/slot/subframe/frame/half-frame/hyperframe.

In accordance with embodiments,

- D denotes time blocks to be used for a downlink transmission,
- U denotes time blocks to be neglected and not used for any transmission, or time blocks to be used for a downlink transmission, and
- S denotes time blocks to be neglected and not used for any transmission, or to be used for a downlink transmission, and the UE is to
  - use time blocks denoted by S or U are for a downlink transmission when needed by a transmission, e.g., in a scenario having a high data load and/or urgent downlink data to be delivered to the UE and/or a data demand with a latency requirement in the downlink, such that the said data has to be transmitted within a certain time window, e.g., wrt. the availability of the radio device in case the UE and/or the radio device are moving, such that the said data may still be delivered in the downlink before one or more of the following:
    - radio link failure, RLF,
    - handover procedure, e.g., normal handover or a conditional handover, CHO, is triggered, or
  - neglect time blocks denoted by S or U dependent on a status of the radio device, e.g., to
    - save power when a level of an energy storage falls short of a predefined threshold or an amount of power used power by a radio device, e.g., a satellite or base station, within a certain time period exceeds a predefined threshold
    - a mobility-related condition, e.g., a handover condition, e.g., CHO is met,
    - a transmission does not need all slots/subframes/half-frames/radioframes/hyperframes,
    - a channel condition, e.g., signal strength or interference ratio is above a configured or preconfigured threshold.

In accordance with embodiments, the UE is to decide whether a time block denoted by S or U is neglected or is used for a downlink transmission dependent on one or more of the following:

- an interference situation, e.g., in case no other radio device performs a transmission within the subframe denoted by S and within a subframe preceding the subframe denoted by S, the subframe denoted by S is used for a downlink transmission,
- a position of the radio device, e.g., in case the radio device is a satellite, and the satellite is moving out of the uplink coverage of the UE, e.g., in case of a non-stationary satellite, e.g., LEO or MEO or a high-altitude platform, HAPS,
- a position of one or more other radio devices, e.g., a position of another satellite and/or HAPS, which is moving into the coverage of the UE.

In accordance with embodiments,

- D denotes time blocks to be neglected and not used for any transmission, or time blocks to be used for an uplink transmission,
- U denotes time blocks to be used for an uplink transmission, and
- S denotes time blocks to be neglected and not used for any transmission, or to be used for an uplink transmission, and the UE is to use time blocks denoted by D or S for an uplink transmission when the UE is located in an area with a large number devices, like IoT-devices, and/or in case of a high resource demand in the uplink.

In accordance with embodiments, the first half-frame includes the time blocks #0, #1, #2, #3 and #4, and the second half-frame includes the time blocks #5, #6, #7, #8 and #9, and a broadcast channel, e.g., a NPBCH, is transmitted in subframe #0, a first synchronization signal, e.g., NPSS, is transmitted in subframe #5, and a second synchronization signal, e.g., NSSS, is transmitted in subframe #9, and wherein time blocks #1, #2, #3, #4, #6, #7 and #5 are used according to one of:

TDD configuration 0,
TDD configuration 1,
TDD configuration 2,
TDD configuration 3,
TDD configuration 4,
TDD configuration 5,
TDD configuration 6,
TDD configuration 7,
TDD configuration 8,
TDD configuration 9,
TDD configuration 10.

In accordance with embodiments, the first half-frame includes the time blocks #0, #1, #2, #3 and #4, and the second half-frame includes the time blocks #5, #6, #7, #8 and #9, and a broadcast channel, e.g., a NPBCH, is transmitted in subframe #0, a first synchronization signal, e.g., NPSS, is transmitted in subframe #5, and a second synchronization signal, e.g., NSSS, is transmitted in subframe #9, and wherein time blocks #1, #2, #3, #4, #6, #7 and #5 are inactive time blocks which are not activated for the communication with the radio device.

In accordance with embodiments, the first half-frame includes the time blocks #0, #1, #2, #3 and #4, and the second half-frame includes the time blocks #5, #6, #7, #8 and #9, and no broadcast channel, e.g., a NPBCH, is transmitted, a first synchronization signal, e.g., NPSS, is transmitted in subframe #5 of the second half-frame, and a second synchronization signal, e.g., NSSS, is transmitted in subframe #9 of the second half-frame, wherein time blocks #0, #1, #2, #3, #4 of the first half-frame are inactive time blocks which are not activated for the communication with the radio device, and wherein time blocks #6, #7 and #5 of the second half-frame are used according to one of:

TDD configuration 0,
TDD configuration 1,
TDD configuration 2,
TDD configuration 3,
TDD configuration 4,
TDD configuration 5,
TDD configuration 6,
TDD configuration 7,
TDD configuration 8,
TDD configuration 9,
TDD configuration 10.

In accordance with embodiments, the first half-frame includes the time blocks #0, #1, #2, #3 and #4, and the second half-frame includes the time blocks #5, #6, #7, #8 and #9, and no broadcast channel, e.g., a NPBCH, is transmitted, a first synchronization signal, e.g., NPSS, is transmitted in subframe #0 of the first half-frame, and a second synchronization signal, e.g., NSSS, is transmitted in subframe #4 of the first half-frame, wherein time blocks #5, #6, #7, #8 and #9 of the second half-frame are inactive time blocks which are not activated for the communication with the radio device, and wherein time blocks #1, #2 and #3 of the first half-frame are used according to one of:

TDD configuration 0,
TDD configuration 1,
TDD configuration 2,
TDD configuration 3,
TDD configuration 4,
TDD configuration 5,
TDD configuration 6,
TDD configuration 7,
TDD configuration 8,
TDD configuration 9,
TDD configuration 10.

In accordance with embodiments, a current active frame triggers a next TDD frame structure in a next active frame and/or in one of a successive active frame having a configured or pre-configured frame offset from the current active frame, and the next TDD frame structure has one of the following configurations:

TDD configuration 0,
TDD configuration 1,
TDD configuration 2,
TDD configuration 3,
TDD configuration 4,
TDD configuration 5,
TDD configuration 6,
TDD configuration 7,
TDD configuration 8,
TDD configuration 9,
TDD configuration 10.

In accordance with embodiments, the UE comprise one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE or Ambient IoT UE, e.g., a sensor, an actuator or a UE provided in a campus network to carry out repetitive tasks and needing input from a gateway node at periodic intervals, or a mobile terminal, or a stationary terminal, or a cellular IoT-UE, an industrial IoT-UE, IIoT, or a SL UE, or a vehicular UE, or a vehicular group leader UE, GL-UE, or a scheduling UE, S-UE, or an IoT or narrowband IoT, NB-IoT, device, a NTN UE, or a WiFi device or WiFi station, STA, or a ground based vehicle, or an aerial vehicle, or a drone, or a moving base station, or road side unit, RSU, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments, the radio device comprises one or more of the following: a macro cell base station, or a small cell base station, or a central unit of a base station, or a distributed unit of a base station, or an Integrated Access and Backhaul, IAB, node, or a road side unit, RSU, or a WiFi access point, AP, or a UE, or a sidelink UE, SL UE, or a group leader UE, GL-UE, or a relay or a remote radio head, or an AMF, or an SMF, or a core network entity, or mobile edge computing, MEC, entity, or a network slice as in the NR or 5G core context, or any transmission/reception point, TRP, enabling an item or a device to communicate using the wireless communication network, the item or device being provided with network connectivity to communicate using the wireless communication network, or a non-terrestrial device, e.g. a moving or stationary air-borne device, like a drone, an unmanned aerial vehicle, UAV, or a high-altitude platform, HAPS, or an airplane, or a moving or stationary space-borne device, like a low earth orbit, LEO, satellite, like a LEO-600 satellite or a LEO-1200 satellite, a medium earth orbit, MEO, satellite, or a geosynchronous earth orbit, GEO, satellite.

The present invention provides a radio device for communicating with one or more user devices, UEs, of a wireless communication system, wherein the radio device is to communicate with the one or more UEs using a radio signal comprising a plurality of time blocks in a time domain, wherein the radio signal comprises a plurality of time blocks used for a communication between the UE and the one or more radio devices, and one or more additional time blocks not used for a communication between the UE and the one or more radio devices, and wherein the radio device is to communicate with one or more of the UEs using two or more of the time blocks, the two or more time blocks being offset by at least one of the additional time blocks of the radio signal.

In accordance with embodiments, the radio device is configured or preconfigured to use an additional time block for one or more predefined activities different from a first service including the communication with the UE.

In accordance with embodiments, the one more predefined activities comprise one or more of the following:

operating a second service, e.g., a non-3GPP service such as a global satellite phone service for voice and data communications, entering a sleep mode, without transmitting and/or receiving, a transmission-only mode, e.g., for transmissions of broadcast services, like a Public Protection and Disaster Relief, PPDR, service, or a wake-up service for IoT devices, or a software update service, a reception-only mode, e.g., shutting down power amplifiers to save power and only perform reception of data signals, like signals from IoT devices, e.g., sensors, a limited transmission-and-reception mode using limited resources, e.g., operating only parts of a time domain, frequency domain, spatial domain and/or code domain.

In accordance with embodiments, the radio device one or more of the following: a macro cell base station, or a small cell base station, or a central unit of a base station, or a distributed unit of a base station, or an Integrated Access and Backhaul, IAB, node, or a road side unit, RSU, or a WiFi access point, AP, or a UE, or a SL UE, or a group leader UE, GL-UE, or a relay or a remote radio head, or an AMF, or an SMF, or a core network entity, or mobile edge computing, MEC, entity, or a network slice as in the NR or 5G core context, or any transmission/reception point, TRP, enabling an item or a device to communicate using the wireless communication network, the item or device being provided with network connectivity to communicate using the wireless communication network, or a non-terrestrial device, e.g., a moving or stationary air-borne device, like a drone, an unmanned aerial vehicle, UAV, or an airplane, or a moving or stationary space-borne device, like a low earth orbit, LEO, satellite, like a LEO-600 satellite or a LEO-1200 satellite, a medium earth orbit, MEO, satellite, or a geosynchronous earth orbit, GEO, satellite.

The present invention provides a wireless communication network comprising:

one or more user devices, UEs, of any one of the embodiments of the present invention, and/or one or more radio devices of any one of the embodiments of the present invention.

The present invention provides a method for operating a user device, UE, for a wireless communication system, the method comprising:

communicating with one or more radio devices using a radio signal comprising a plurality of time blocks in a time domain, wherein the radio signal comprises a plurality of time blocks used for a communication between the UE and the one or more radio devices, and one or more additional time blocks not used for a communication between the UE and the one or more radio devices, and wherein the UE communicates with one or more of the radio devices using two or more of the time blocks, the two or more time blocks being offset by at least one of the additional time blocks of the radio signal.

The present invention provides a method for operating a radio device for communicating with one or more user devices, UEs, of a wireless communication system, the method comprising:

communicating with the one or more UEs using a radio signal comprising a plurality of time blocks in a time domain, wherein the radio signal comprises a plurality of time blocks used for a communication between the UE and the one or more radio devices, and one or more additional time blocks not used for a communication between the UE and the one or more radio devices, and wherein the radio device communicates with one or more of the UEs using two or more of the time blocks, the two or more time blocks being offset by at least one of the additional time blocks of the radio signal.

Embodiments provide a computer program product comprising instructions which, when the program is executed by a computer, causes the computer to carry out one or more methods in accordance with the present invention.

Figure 10:
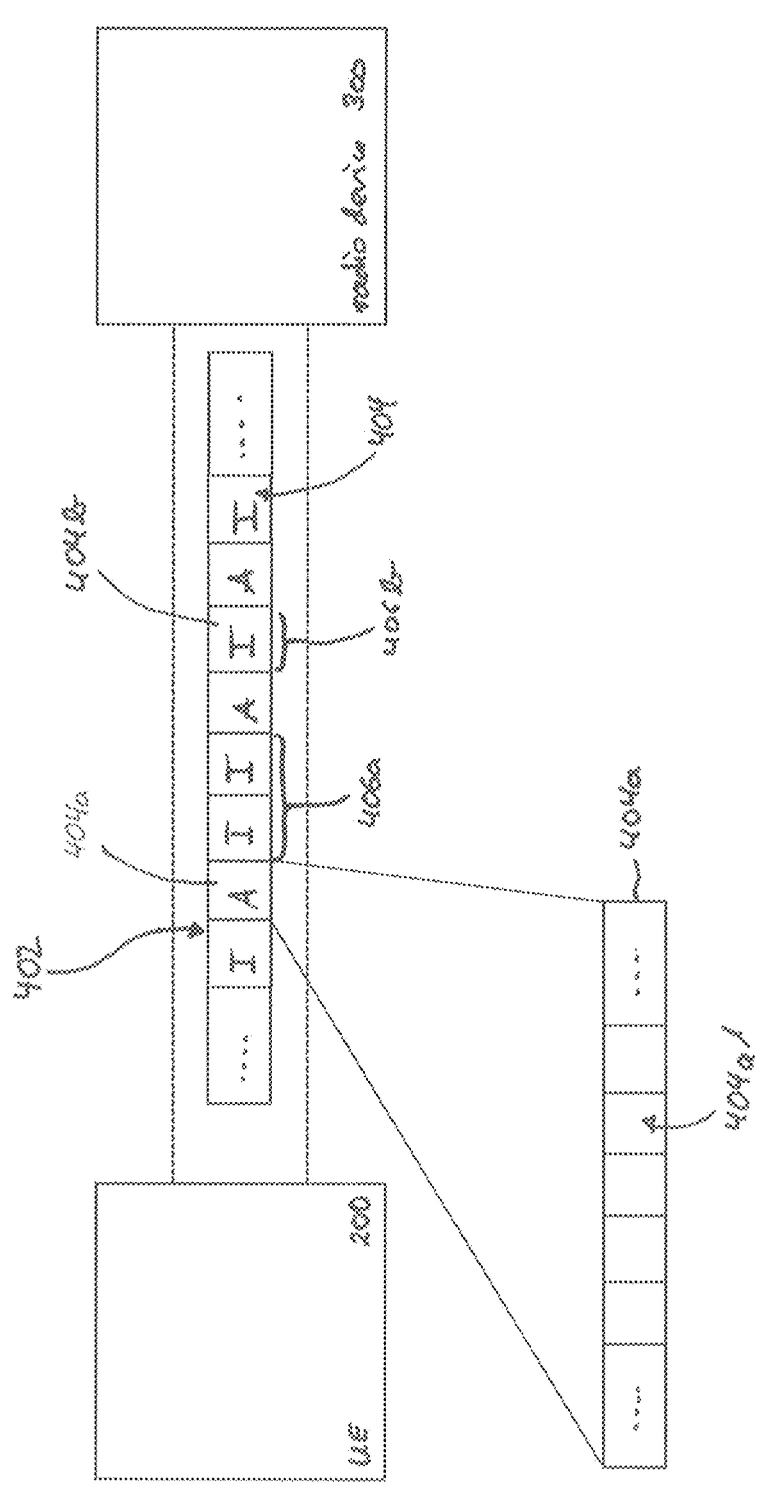
FIG. 10 illustrates a wireless communication system including a user device and a radio device in accordance with embodiments of the present invention, FIG. 11A to FIG. 11C illustrates a radio signal having active and inactive frames in the time domain in accordance with embodiments of the present invention.
Figure 4A:
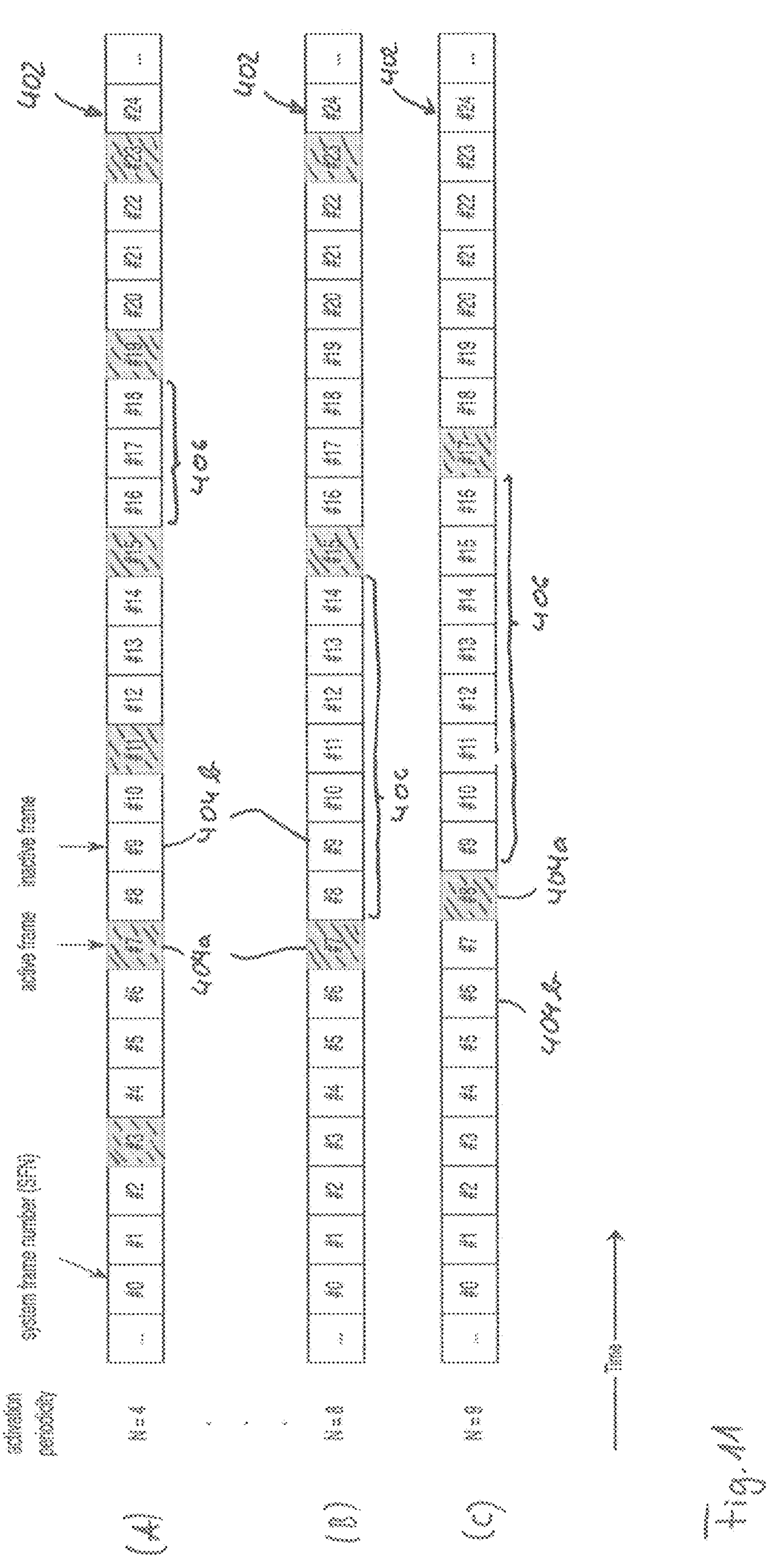

FIG. 10 illustrates an embodiment of a user device or user equipment, UE, for a wireless communication system, like the wireless communication systems described above with reference to FIG. 1A, FIG. 1B, FIG. 2, FIG. 9A, FIG. 9B or FIG. 9C. The UE 200 is to communicate with one or more radio devices 300. The UE 200 communicates with the radio device 300, like a base station or another UE, using a configured or preconfigured radio signal 402 comprising a plurality of time blocks 404 in a time domain. The radio signal 400 comprises a plurality of time blocks 404*a* which are used for a communication between the UE 200 and the radio device 300. The time blocks 404*a* are labeled "A" and are also referred to as first time blocks, active or activated time blocks or as communication time blocks. The radio signal 400 comprises one or more additional time blocks 404*b* which are not used for a communication between the UE and the one or more radio devices, i.e., in the additional time blocks there are no transmissions related to the communication between the UE 200 and the radio device. For example, there is no transmission of any control or payload data nor of any reference, synchronization or pilot signals, like downlink pilot time slots, DwPTS, or uplink pilot time slots, UpPTS. The additional time blocks 404*b* are labeled "I" and are also referred to as non-communication time blocks or inactive or deactivated time blocks. The UE 200 communicates with the radio device 300 using two or more of the first time blocks 404*a* which are offset by at least one of the additional time blocks 404*b* of the radio signal, as is illustrated at 406*a* (offset=two additional time block 404*b*) and at 406*b* at 406*a* (offset=one additional time block 404*b*). The time blocks 404*a* comprise a plurality of sub-time blocks 404*a*1 and may have a time block structure as in the embodiments described in more detail below.

In accordance with embodiments, a time block 404 may be one or more of the following:

- a radio frame or frame, for example, a 10 ms frame as defined by the LTE or 5G standard,
- a certain number of radio frames or frames, like a certain number of consecutive radio frames or frames as defined by the LTE or 5G standard,
- a half-frame, like a radio frame or frame composed of two half-frames,
- a subframe, for example, a radio frame may be composed of ten subframes as defined in the LTE or 5G standard,
- or a slot, for example a subframe may be composed of two slots.

The present invention is not limited to the above-mentioned structure of time blocks, rather, other embodiments may use other combinations of frames, radio frames, half-frames, subframes or slots as a time block.

The radio device 300 may operate under a strict power constraints, like a battery powered UE or a satellite due to a limited power generation by solar panels on the satellite or due to a limited fuel capacity which is carried by the satellite. Such constraints impact the telecommunication system that may be provided in the radio device, and power saving may be achieved by simply switching off the radio equipment. A finer, more granular way of power saving is provided by the inventive approach allowing for an appropriate configuration of the wireless communication or radio system so as to inherently operate in a more power efficient way, namely by adopting a radio signal 402, like a frame structure used in the wireless communication system. For example, in case of a 3GPP system, like an LTE system or an NR system or a 6G system, embodiments of the present invention configure the radio signal 402 such that a power consumption for a signal processing in the radio device may be controlled finer and, thereby, may be minimized or at least reduced. This is achieved by enabling/activating or disabling/deactivating certain transmissions and/or receptions in the time domain so that the radio device 300 may save power during the deactivated time blocks.

In accordance with other embodiments, power saving may not be the key issue with regard to the operation of the radio device, rather, the radio device may use parts of the radio signal for other 3GPP or non-3GPP services, like:

1. Broadcasting: Telecommunication satellites are used to transmit television and radio signals for broadcasting services. Direct-to-home (DTH) television, satellite radio, and other broadcasting services are delivered to homes and businesses via satellite.
2. Telephony and Voice Services: Telecommunication satellites enable voice communication services, including long-distance and international calling. They support traditional telephony services as well as Voice over Internet Protocol (VoIP) applications.
3. Internet Connectivity: Telecommunication satellites provide internet connectivity to remote and underserved areas where terrestrial infrastructure is limited or unavailable. Satellite broadband services deliver high-speed internet access to users worldwide.
4. Mobile Communication: Satellites support mobile communication services, including mobile phone networks, satellite phones, and mobile data services. They play a crucial role in extending coverage to remote regions and enhancing network capacity.
5. Navigation and Positioning: Global Navigation Satellite Systems (GNSS) such as GPS, GLONASS, and Galileo rely on satellite signals for accurate positioning, navigation, and timing services for various applications, including transportation, mapping, and emergency services.
6. Data and Video Services: Telecommunication satellites transmit data services, such as video conferencing, file transfers, and cloud services. They support data-intensive applications for businesses, government agencies, and individuals.
7. Disaster Recovery and Emergency Communication: Satellites are used for emergency communication and disaster recovery efforts, providing reliable connectivity during natural disasters, humanitarian crises, and other emergencies when terrestrial infrastructure is compromised.
8. Remote Sensing and Earth Observation: Earth observation satellites capture images and data for various applications, including environmental monitoring, agriculture, urban planning, and disaster management.

Such other parts of the radio signal may be employed for other services offered by the network operator. For example, when considering a non-terrestrial network, a global satellite communication provider, like Iridium®, besides providing satellite phone services, may provide a part of the signal provided by the satellites for IoT services, e.g., 3GPP IoT services. In accordance with embodiments, the radio signal 402 is such that only those time blocks are used for a communication with the radio device which correspond to time blocks in the radio device's communication signal that may be used for a communication with the UE, e.g., time blocks 404*a* in FIG. 10, while the additional time blocks 404*b* may be used for other purposes.

For example, additional time blocks 402*b* in the signal 402 may be used by the radio device to operate a different service, for example, a non-3GPP service such as the above-mentioned global satellite phone service for voice and data communications. In accordance with other embodiments, rather than offering a different service, for example when power saving is an issue, the radio device may go into a sleep mode without transmitting and/or receiving. Further, the additional time blocks may be reserved for transmissions only, for example for transmissions of broadcast services, like a public protection and disaster relief, PPDR, service or for software update services, for example for applications running on the UE 200, or for wake-up services, for example for sending paging signals for IoT devices, like UE 200.

In the following, further embodiments of the present invention are described with reference to a radio signal including, as a time block, a frame, however, it is noted that, unless stated otherwise, all subsequently outlined embodiments may include a radio frame structure having time blocks as defined above, namely as frames or subframes or radio frames or slots or the like.

As described above, embodiments of the present invention provide a radio system that is configured or preconfigured to allow activation of single time durations, by the above-mentioned time blocks, e.g., frames or radio frames or subframes or slots.

FIG. 11A to FIG. 11C illustrates the radio signal 402 with radio frames having active frames 404*a* (hatched) and inactive or additional frames 404*b* (blank) in the time domain in accordance with embodiments of the present invention. FIG. 11 represents radio frames having the system frame numbers #0 to #24 and in FIG. 11A the radio frames #3, #7, #11, #15, #19, and #23 are indicated as active frames or time blocks 404*a* while all other frames are indicated as inactive frames or additional time blocks 404*b*. The active frames 404*a* and the inactive frames 404*b* are offset 406 by 3 frames. In FIG. 11B, in accordance with another embodiment, only frames #7, #15, and #23 of the radio signal 402 are active frames 404*a*, with the active frames 404*a* and the inactive frames 404*b* are offset 406 by 7 frames, and in FIG. 11C, only frames #8 and #17 of the radio signal 402 are shown as active frames 404*a*, with the active frames 404*a* and the inactive frames 404*b* are offset 406 by 8 frames. The active radio frames 404*a* illustrated in FIG. 11 may be configured with certain radio frame structures that may be the same for each active frame 404*a* or that may differ among active frames.

Figure 12:
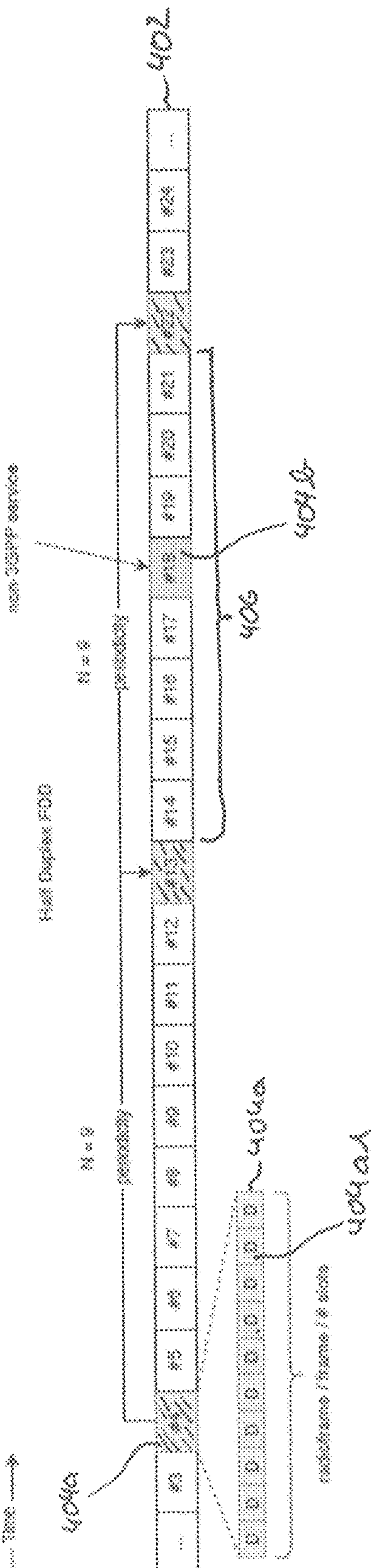
FIG. 12 illustrates a radio signal having one or more active downlink frames in accordance with embodiments of the present invention.

FIG. 12 illustrates a radio signal 402 similar to the radio signal of FIG. 11C in which an active frame #4 has a frame structure where all sub-time blocks or sub-frames 404*a*1 are labeled "D", i.e., the frame #4 is used by the UE 200 for receiving a downlink, DL, transmission from the radio device 300. In accordance with other embodiments, all sub-time blocks or sub-frames 404*a*1 of frame #4 may be used by the UE 200 for transmitting an uplink, UL, transmission to the radio device 300. Further, FIG. 12 illustrates that the radio device 300 may use one or more of the inactive frames for non-3GPP services or for another one of the above-mentioned actions, like inactive frame #18.

FIG. 13 illustrates a radio signal 402 similar to the radio signal of FIG. 12 in which the active frame #4 has a frame structure where all sub-time blocks or sub-frames 404*a*1 are labeled "D", i.e., the frame #4 is used by the UE 200 for receiving a downlink, DL, transmission from the radio device 300. The DL transmission is associated with an UL transmission from the UE 200 to the radio device 300 as is illustrated at 408. One of the active frames following active frame #4 may be used for the uplink transmission to the radio device, e.g., active subframe #13 having a frame structure where all sub-time blocks or sub-frames 404*a*1 are labeled "U", i.e., the frame #13 is used by the UE 200 for transmitting the UL, transmission to the radio device 300.

In accordance with embodiments of the present invention, the offset 406 between the active frames 404*a* may be estimated by the UE 200, e.g., using/dependent on one or more of the following:

- energy detection of the signaling received on one of a plurality of time blocks, e.g., peak detection, e.g., sequence detection by correlation,
- using a prediction pattern, e.g., based on an AI-ML model trained on past receptions,
- indirectly, e.g., by decoding of signals received from one or more further UEs, e.g., which are transmitting to the one or more of the radio devices.

In accordance with other embodiments of the present invention, the offset 406 between the active frames 404*a* may be defined by a configured or preconfigured periodicity or by a configured or preconfigured pattern, e.g., a bitmap or vector.

In accordance with embodiments, the configured or preconfigured pattern defines one or more of the following:

- a periodic pattern, e.g., with a fixed period n,
- a burst pattern, e.g., consisting of m consecutive time blocks or consisting of m consecutive time blocks separated by one or more additional time blocks not used for communication between the UE and the one or more radio devices,
- a pattern based on a service requirement of a UE, e.g., adopted to one or more of
  - a low delay service requirement, e.g., having a shorter period,
  - a best-effort service requirement, e.g., having a larger delay,
- a pattern according to a service requirement of the radio device, e.g.,
  - a low delay service requirement, e.g., having a shorter period,
  - a best-effort service requirement, e.g., having a larger delay,
- a handover pattern, e.g., in case a UE is currently performing a random access, e.g., PRACH or is about to perform a PRACH, the pattern may be adopted accordingly, e.g., using a pattern having more time slots, so
  - that the random access process may be performed faster or
  - that the probability of a successful random access may be increased,
- a measurement pattern, e.g., in case the radio device needs faster feedback information from the said UE, the pattern may be adopted to allow more measurement time slots=more time slots within the pattern, or vice versa.

In accordance with embodiments, the periodicity indicates one or more periods P with which the active frames or time blocks 404*a* occur. The offset may have a minimum or maximum value, e.g., based on a configured or preconfigured value or threshold. Also, the offset may be configured per UE or for a group of UEs, e.g., a group containing one or more further UEs. The offset may be defined by a configured or preconfigured periodicity or by a configured or preconfigured pattern, e.g., a bitmap or vector. The offset value may also be defined by a previous offset value, the previous offset value being one of: greater than the previous value, or greater than or equal to the previous value, or smaller than the previous value, or smaller than or equal to the previous value.

A period N may be configured or preconfigured to be a single value, for example N=4 in FIG. 11A meaning that every fourth frame is activated for a communication between UE 200 and the radio device 300. FIG. 11B illustrates N to be 8 meaning that every eighth radio frame is active, while FIG. 11C, FIG. 12 to FIG. 17 illustrate embodiments in which N=9, i.e., every ninth radio frame is active.

In accordance with further embodiments, periodicities for different types of active frames may be used, e.g. first active frames associated with a DL transmission may have a first period and second active frames associated with an UL transmission may have a second period. FIG. 14 illustrates the radio signal 402 using a combination of a DL period of N=9 and an UL period of N=9. Thus, every ninth frame (starting with frame #4) is an active DL frame, namely frames #4, #13 and #22, while every ninth frame (starting with frame #16) is an active UL frame, namely frames #16 and #25. The respective starting frames are selected such that the active frames of different type are also offset, e.g., by a minimum gap 410 illustrated in FIG. 14 that may one or more inactive frames.

Like in FIG. 13 also in FIG. 14 the active DL frame #4 has a frame structure where all sub-time blocks or sub-frames **404*a*1 are labeled "D", i.e., the frame #4 is used by the UE 200 for receiving a downlink, DL, transmission from the radio device 300. The DL transmission is associated with an UL transmission from the UE 200 to the radio device 300 as is illustrated at 408** and the UL transmission is performed in the active UL frame #16.

Figure 15:
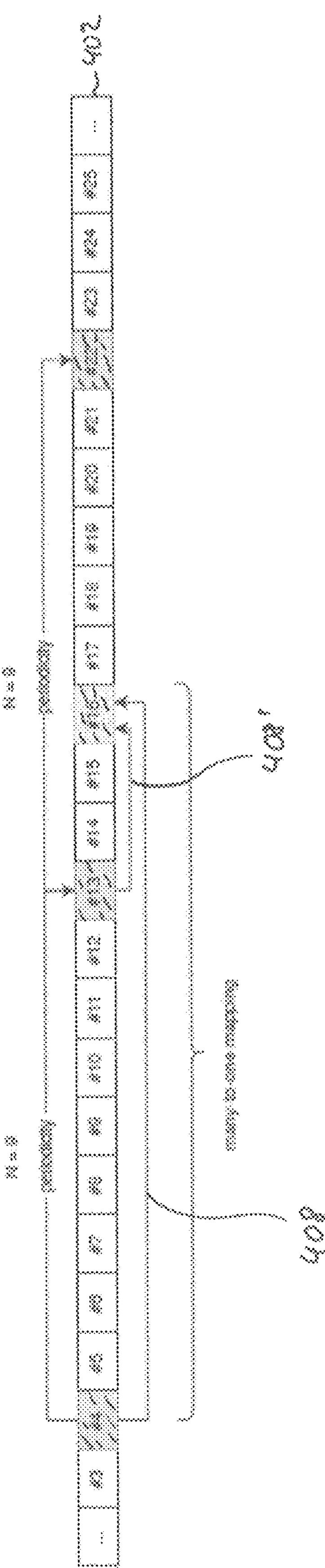
FIG. 15 illustrates a radio signal as in FIG. 14 with a many-to-one mapping of two downlink frames to one uplink frame in accordance with embodiments of the present invention.

In accordance with further embodiments, UL transmissions associated with two or more active DL frames may performed in one active UL frame, which is also referred to as a many-to-one mapping. FIG. 15 illustrates a radio signal 402 as in FIG. 13 including the active DL frames #4 and #13 associated with a DL transmission and having the first period N=9 and the active UL frame #16 associated with an UL transmission and having a second period N=9. The active DL frames #4 and #13 may have a frame structure where all sub-time blocks or sub-frames are used by the UE 200 for receiving a downlink, DL, transmission from the radio device 300. The DL transmissions are associated with respective UL transmissions from the UE 200 to the radio device 300 as is illustrated at 408 and 408' and the UL transmissions are performed in the active UL frame #16. This is illustrated in more detail in FIG. 16. As is shown, a first half of the active UL frame #16 is used for the UL transmission associated (408') with the DL transmission in the DL frame #13, and a second half of the active UL frame #16 is used for the UL transmission associated (408) with the DL transmission in the DL frame #4.

Figure 17:
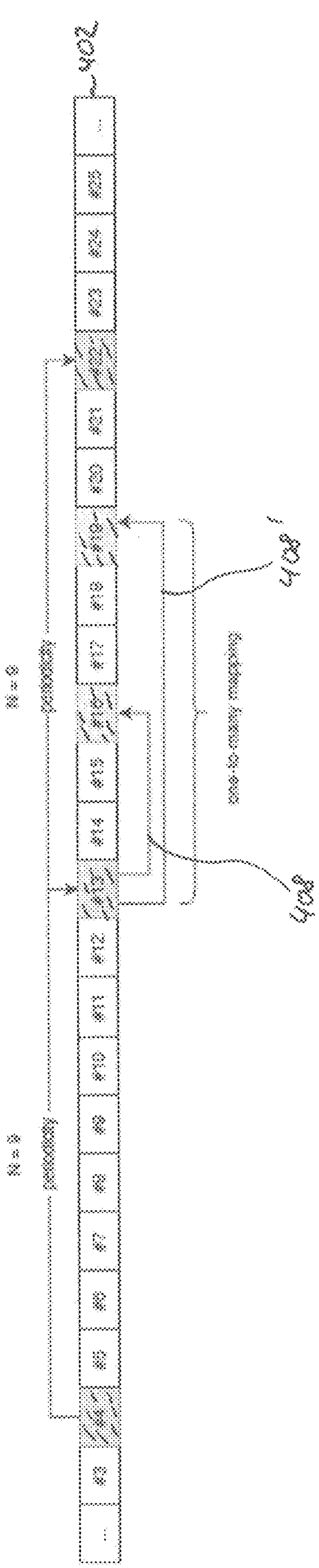
FIG. 17 illustrates a radio signal as in FIG. 14 with a one-to-many mapping of one downlink frame to two uplink frames in accordance with embodiments of the present invention.

In accordance with further embodiments, an UL transmission associated with more active DL frames may performed in two or more active UL frames, which is also referred to as a one-to-many mapping. FIG. 17 illustrates a radio signal 402 as in FIG. 13 including the active DL frames #4 and #13 associated with a DL transmission and having the first period N=9 and the active UL frame #16 associated with an UL transmission and having a second period N=9. The active DL frame and #13 may have a frame structure where all sub-time blocks or sub-frames are used by the UE 200 for receiving a downlink, DL, transmission from the radio device 300. The DL transmission is associated with an UL transmission from the UE 200 to the radio device 300 as is illustrated at 408 and 408' and the UL transmission is are performed in the active UL frame #16 and in a further active frame #19.

In the embodiments of FIG. 12 to FIG. 17 the active frames of different type have the same period. In accordance with other embodiments, different periodicities for the different frame types may be used. For example, DL frames may have a period of N=4 and UL frames may have a period N=9. The different periods for the frames and the starting frames are selected such that the active frames of different periodicity are also offset, e.g., by a minimum gap of one or more inactive frames.

In accordance with embodiments, the one or more periods N may be set or adapted depending on one or more of the following:

A load in the wireless communication system. For example, in case of a higher load in the downlink, a duplex configuration with more D subframes/frames/slots/half-frames are configured, vice versa for the uplink. According to another example, a shorter period is selected for non-bursty traffic, like a transmission or reporting of a measurement value, than for bursty traffic, like over-the-air firmware updates or configurations, e.g., for one or more or a large amount of devices.

Delay or latency requirements, e.g., in case of a latency requirement with requirements of downlink and uplink transmission, a duplex pattern may be chosen that allows switching between downlink and uplink slots, and vice versa.

A number of users, e.g., IoT devices, in the wireless communication system,

A position of the radio device, e.g., a shorter period is selected for a radio device is located in a densely populated geo-location, like a city, than for a radio device is located in a sparsely geo-location, like a countryside.

A power budget of the radio device, e.g., in case of low battery power, certain time instances in the duplex configuration may be neglected. According to another example, a shorter period is selected for a radio device having a remaining battery power or a used power within a certain time period above a predefined threshold than for a radio device having a remaining battery power or used power within a certain time period below the predefined threshold.

A power budget of the user device. For example, a larger period for a user device being low on power, in order to perform power saving and being able to perform transmission for a maximum time, or a smaller period for a user device being low on power, in order to perform an urgent transmission before the user device runs out of power, e.g., in case the power is drained by a certain number of receptions and/or transmissions.

A radio condition, e.g., pathloss or interference or signal a quality (SNR, SINR, rank, RSSI, RSRP, RSRQ) or delay spread.

A service used by the radio device.

A 3GPP service, e.g., a 3GPP IoT service, a disaster services, like a public protection disaster relieve, PPDR, service. For example, the period may be is one or more of the following:
- a period selected by a core network, CN, e.g., a CN function implementing a PPDR service within a cellular network,
- a period configured wrt. an emergency code, e.g., 911 or 112 code,
- a period selected based on a message type (1. Earthquake and Tsunami Warning, 2. Tornado Warning, 3. Hurricane Warning, 4. Wildfire Warning, 5. Flooding Warning, 6. Avalanche Warning, 7. Industrial Accident Warning, 8. Nuclear Power Plant Warning, 9. Terrorist Attack Warning), e.g., the type of emergency, e.g., based on an emergency code, e.g., having a
- a period shorter period in case of a hazardous emergency,
- a period a larger period in case of an informative warning message.

A 3GPP device type, e.g., normal NR or eMBB UEs, NB-IoT, eMTC, NR, NR-NTN, IoT-NTN, RedCap, A-IoT, where the period is selected according to the processing capabilities of the particular device, e.g.,
- NB-IoT having a larger period due to the slower processing capabilities,
- eMTC having a shorter period, due to the higher processing capabilities, 3GPP devices may be preferred wrt. non-3GPP devices, thus having a shorter period, or vice versa.

A non-3GPP service, e.g., in case of other technology operating in the same frequency band, a pattern having guard band, e.g., S slots or neglected slots may be configured, such that interference between these systems is reduced or avoided, e.g., to allow coexistence between 3GPP and non-3GPP devices. The period may be shorter, in case of a higher precision in a positioning requirement, or larger, in case of a lower prediction in a positioning requirement.

In accordance with embodiments, the DL transmissions from the radio device 300 may include one or more of the following:

- a transmission of one or more broadcast signals, e.g., containing one or more of the following:
  - master information block, MIB, e.g., containing essential information about the physical layer configuration of the cell, including the cell ID, bandwidth, subcarrier spacing, and frame structure, etc.,
  - system information block, SIB, carrying specific information such as cell-specific parameters, neighbor cell information, mobility management, and radio resource control parameters,
- a transmission of one or more synchronization signals, e.g.,
  - multiple SSBs within a shorter time frame in order to receive the corresponding feedback from the UEs with respect to the desired spot-beams,
  - a part of a synchronization signal, e.g., a primary synchronization signal, PSS only, or a secondary synchronization signal, SSS only,
- a transmission of one or more sounding signals, e.g., positioning reference signals (PRS) or sounding reference signals, SRS, where these signals may be used for integrated communication and sensing, ICAS,
- a transmission of one or more unicast signals, e.g., signals having a high priority, like signals of premium services, or a signal addressed to a single UE only, e.g., wrt. a UE identifier,
- a transmission of one or more groupcast or multicast signals, e.g., wake-up signals for a group of IoT devices,
- a transmission concerning a retransmission, e.g., transmitted via Physical Hybrid ARQ Indicator Channel (PHICH).

In accordance with yet other embodiments, responsive to certain events experienced, for example, at the UE 200 and at the radio device 300 additional frames, i.e., frames which are not activated according to the selected periodicity, may be activated. The activation may be in accordance with a certain pattern, for example, a bit map or a vector. Such additional frames may be used for compensating or handling certain traffic bursts Responsive to a certain situation, like a traffic burst in case the UE has to transmit an amount of data exceeding the capacity of one active frame, additional UL frames may be activated for transmitting a burst of data.

In accordance with further embodiments of the present invention, in case a certain signal is received within an active radio frame or within an inactive radio frame, one or more predefined events may be triggered or one or more further frames to be used for the communication may be activated. The certain signal comprises one or more of the following:

- a control signal, e.g., PDCCH, or control embedded into the data channel, e.g., PDSCH, or control contained within the downlink broadcast channel, PBCH,
- a request for data, e.g., a scheduling assignment to transmit data in the uplink,
- a request for control, e.g., a scheduling assignment to transmit control in the uplink, e.g., the control comprising one or more of the following:
  - RRC, e.g., a radio resource control message, e.g., a RRC-handshake,
  - MAC-CE, e.g., a transmission of a MAC control element,
  - Physical layer, PHY, control, e.g., contained within a downlink control information, DCI, or an uplink control information, UCI,
- a measurement request, e.g., for one or more of the following:
  - transmitting a feedback information in the uplink, e.g., channel state information, CSI, such as a channel quality indicator, CQI, or a preferred matrix index, PMI, or a rank indicator, CQI,
  - transmitting a position-related information, e.g., containing a geo-location, e.g., a GPS position,
- a HARQ information or retransmission request, e.g., an acknowledgement message, ACK or a negative ACK, NACK, e.g., transmitted via physical hybrid ARQ indicator channel, PCFICH,
- transmission of a position reference symbol, PRS,
- a synchronization signal, e.g., PSS and/or SSS, e.g., which may trigger a random access.

The one or more predefined events may include one or more of the following:

- a particular time block pattern is activated and/or deactivated,
- all time blocks are deactivated until a certain time window or event,
- a burst pattern is activated or deactivated,
- a particular time block pattern or burst pattern is activated within a certain offset in the time domain or in a frequency domain,
- an periodicity of time blocks is changed, e.g.,
  - the periodicity is increased,
  - the periodicity is decreased,
  - the periodicity is modified within a time offset, e.g., in x time blocks,
- one or more active time blocks are skipped, e.g., depending on a criterion like a length of a previous activation period, e.g., a previous activation period may have been
  - too short for a transmission requirement of the UE, so that the said UE needs more future slots for a successful transmission of the said data, or
  - long enough, so that a transmission of data was successful and that the said UE may send a scheduling request, SR, for future transmission, e.g., in case it has data to transmit.

The further frame may include the following information.

- broadcast information, e.g., MIBs/SIBs, a PBCH,
- a control channel, e.g., a PDCCH by transmitting DCIs or UCIs, or PCFICH, or PHICH,
- a data channel, e.g., a PDSCH, which may be used to transmit control, e.g., RRC IE, or data,
- satellite-specific control information, e.g., information which is only used for satellite systems, e.g., Ephemeris data, or special timing advance, TA, configurations, which adhere to the long delay of satellites, e.g., LEO, MEO or GEO satellites, when compared to terrestrial communication systems, TN, or a spot beam identifier, e.g. related to a beam formed by the radio device, e.g. a spot beam formed by the satellite. Furthermore, the information related to the spot beam may be further extended to cover also a list of neighboring spot beams like a neighborhood list or a list of n-strongest spot beams. In a further embodiment this list may be obtained from a single radio device perspective, e.g., single satellite with multiple spot beams or to cover multiple radio devices, e.g., multiple satellites and beams.

In accordance with further embodiments of the present invention, a carrier aggregation may be implemented. The system of the present invention may operate on a given or anchor carrier and, in addition, on another carrier, for example, in regions or as time instances with higher uplink traffic demands. The aggregated carrier may be configured to operate with one or more active frames which are only used for a certain transmission direction, e.g., downlink only or uplink only or sidelink only, or any combination of these. Thus, the aggregated carrier is used as a capacity boost for another carrier having no restriction wrt. the transmission direction in its configuration. The first and the second carriers may be separated by a configured or preconfigured frequency range, e.g., at least a 10 MHz carrier or at least a 180 kHz carrier, which is the NB-IoT carrier bandwidth. This may be used to ensure out-of-band emission or interference requirements or adjacent channel leakage ratios, ACLR, requirements.

Stated differently, the aggregated carrier may operate using a radio signal structure similar to the one in the given carrier so that not all of the time blocks/frames or not all sub-time blocks/subframes in a time block/frame are activated for a communication between the UE 200 and the radio device 300. If the radio signal in the aggregated carrier includes active radio frames, a corresponding signalization may be done through the anchor carrier. In accordance with embodiments, the anchor carrier and the aggregated carrier may use the same pattern of active time blocks/sub-time blocks. In accordance with other embodiments, the pattern of activated time blocks/sub-time blocks may be different in the anchor carrier and the aggregated carrier.

Figure 18:
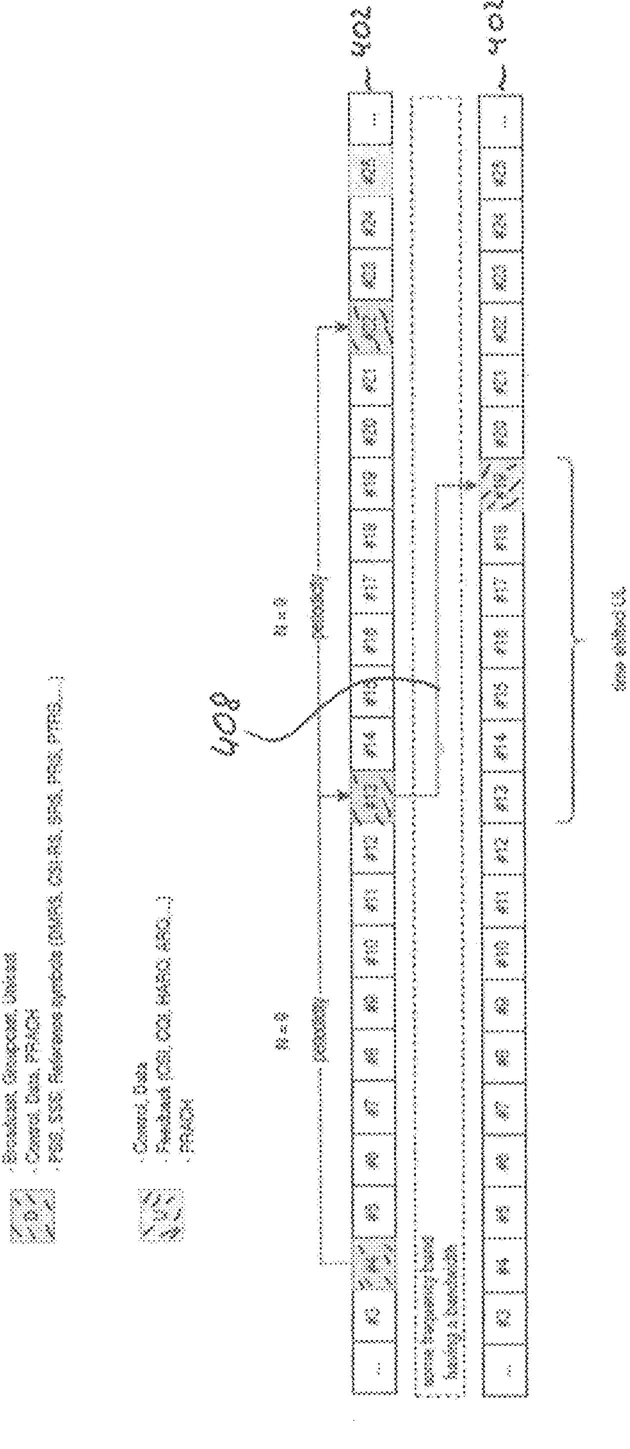
FIG. 18 illustrates carrier aggregation in accordance embodiments of the present invention.
Figure 19:
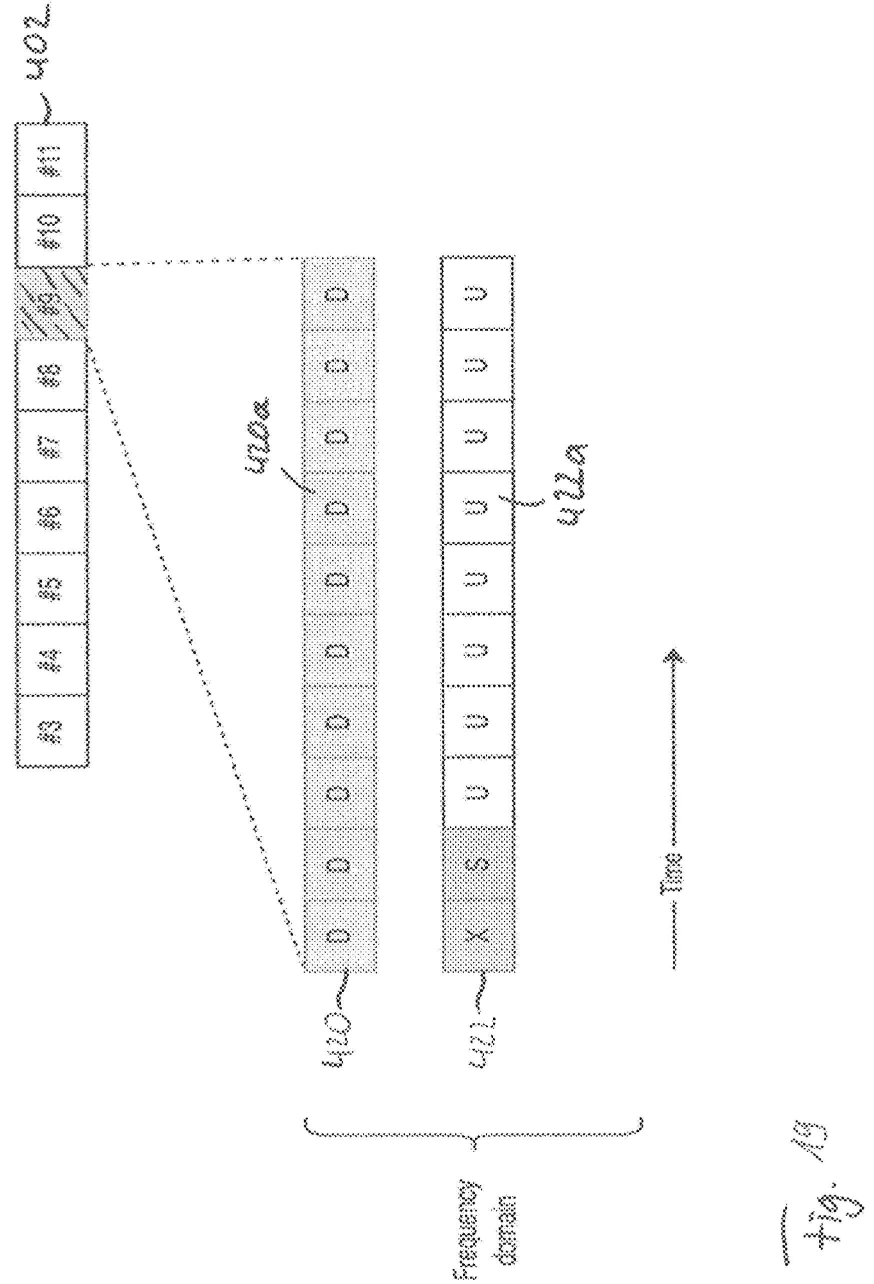
FIG. 19 illustrates the use of parallel subchannels using different frame structures in accordance with embodiments of the present invention.

FIG. 18 illustrates an embodiment for a carrier aggregation. The communication between the UE 200 and the radio device 300 uses a first radio signal 402*a* according to the present invention in a first frequency band NB-IoT1, and a second radio signal 402*b* according to the present invention in a second frequency band NB-IoT2. The first and second frequency bands may be adjacent or, as illustrated in FIG. 19 offset in frequency with one or more additional frequency bands therebetween. The frequency bands may also be referred to as channel, sub-channels or bandwidth parts, BWPs. For example, the respective carriers on which the radio signals 402*a*, 402*b* are transmitted may be at different frequency within one BWP or in different BWPs. In the embodiment depicted in FIG. 19, the first or anchor band/carrier NB-IoT1 band may be a DL band with the active DL frames #4, #13 and #22 (see also FIG. 12). The second band/carrier NB-IoT2 band may be an UL band with the active UL frame #19 for an UL transmission associated with a DL transmission in frame #13 of the anchor band/carrier NB-IoT1.

In accordance with yet other embodiments, parallel channels may be provided in the frequency domain. In each channel, respective radio signal structures are used which may be the same in each channel or which may be different thereby leveraging the effect of cross-channel interference from UL and DL at, for example, different satellites. FIG. 19 illustrates parallel IoT subchannels using different frame structures. FIG. 19 illustrates a part of the radio signal 402, more specifically, the frames or time blocks #3 to #11. For example, during an active frame #9, a communication may include the two subchannels 420 and 422 separated in the frequency domain. The subframes 420*a* of the frame in subchannel 420 are all provided for a downlink transmission "D", whereas the subframes 422*a* in the second subchannel 422 include subframes labeled "X" and "S", which may be neglected or used for uplink transmissions as decided by the UE 200, while the remaining subframes are all used for uplink transmissions "U" from the UE 200 to the radio device 300. For example, when the subchannels 420 and 422 are used by different satellites, based on known positions of the satellites, like their location or using Ephemeris data, crossing trajectories of the satellites are known and the subchannel may be configured or reconfigured for certain spot beams per satellite, thereby allowing the subchannels to be shifted in such a way that IoT devices or UEs 200 may transmit and/or receive, thereby decreasing any delays experienced in the system.

In the embodiments so far, the time blocks are described with an arbitrary configuration of the sub-time blocks/time resources for communicating data between the UE 200 and the radio 300, i.e., in accordance with the above embodiments, whether respective sub-blocks are fully or partly used for uplink or downlink transmissions may be freely configured.

Figure 20:
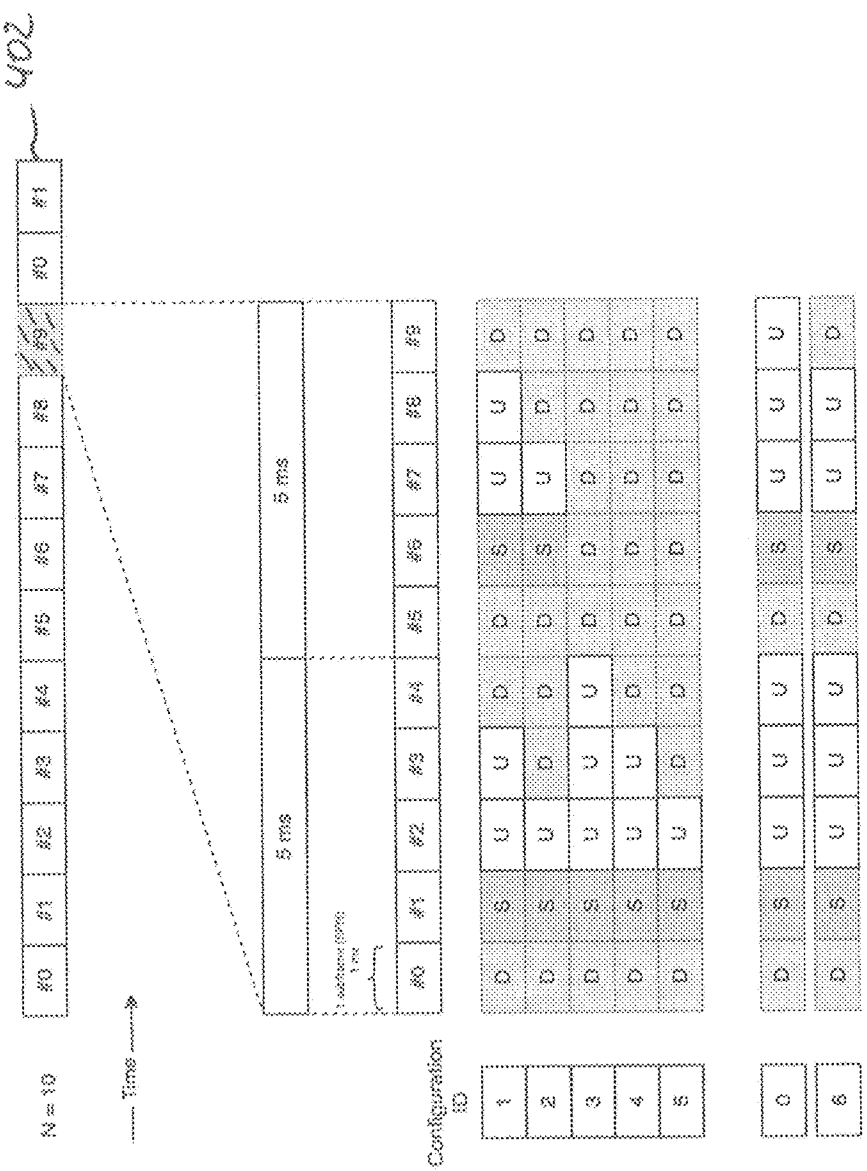
FIG. 20 illustrates an LTE TDD uplink-downlink slot/subframe assignment in accordance with embodiments of the present invention.

In accordance with other embodiments of the present invention, the already well-defined NB-IoT TDD frame structure is employed, i.e., the above-described time-blocks are frames in accordance with the NB-IoT TDD frame structure, and the sub-time blocks are subframes in accordance with the NB-IoT TDD frame structure. Stated differently, in accordance with embodiments of the present invention, an active frame 404*a* in FIG. 10 to FIG. 19 may be configured using a particular TDD pattern which is also used in LTE TDD. FIG. 20 illustrates the uplink-downlink slot/subframe assignment in accordance with LTE TDD. In FIG. 20, the radio signal 402 is illustrated with a periodicity N of active frames being ten. Starting with the frame #0, this means that the tenth frame, namely frame #9, is an active frame while the preceding frames are all inactive frames. In the embodiment of FIG. 20, after an active frame, the frame numbers are reset so that the following frames start again with frame number #0. The frame #9 is a frame in accordance with the NB-IoT TDD structure having a duration of 10 ms and including ten subframes #0 to #9. The frame #9 also comprises the two half-frames having a duration of 5 ms. Each half-frame includes five subframes, namely the first half-frame includes the subframes #0 to #4 and the second half-frame includes the subframes #5 to #9.

In accordance with further embodiments, the radio device is a non-terrestrial network (NTN) entity, and the UE is an Internet-of-Things (IoT) device operating in time division duplex (TDD) mode in an IoT-NTN TDD band, e.g., at 1616-1626.5 MHz. The uplink (UL) and downlink (DL) transmissions are separated in the radio signal in a time domain, and the radio signal has a frame structure, like a frame structure type 1, with a frame duration of 10 ms and 10 subframes per frame. The plurality of time blocks has a set of D non-overlapping consecutive or usable contiguous DL subframes and a set of U consecutive or usable contiguous UL subframes. One or more additional time blocks define a fixed guard period (GP) separating the consecutive or contiguous DL subframes and the consecutive or contiguous UL subframes. In accordance with embodiments, a pattern of contiguous DL subframes, GP and contiguous UL subframes is repeated every N radio frames.

In accordance with yet further embodiments, the radio device is a non-terrestrial network (NTN) entity, and the UE operates in a NTN time division duplex (TDD) mode in a TDD band, e.g., in TDD band 249. The radio signal has a frame structure, like a frame structure type 1, with a frame duration of 10 ms and 10 subframes perframe, and at an uplink time synchronization reference point, the frame structure comprises D, e.g., 8, contiguous or consecutive downlink (DL) subframes, followed by G1 (guard 1), e.g., 50, contiguous or consecutive guard period (GP) subframes, followed by U, e.g., 8, contiguous or consecutive uplink (UL) subframes, followed by G2 (guard 2), e.g., 24, contiguous or consecutive guard period (GP) subframes. The pattern of the D=8 consecutive DL subframes, followed by the G1=50 consecutive GP subframes, followed by the U=8 consecutive UL subframes, followed by the G2=24 consecutive GP subframes, is repeated at a predefined interval, e.g., each 90 ms.

Figures 20A, 20B:
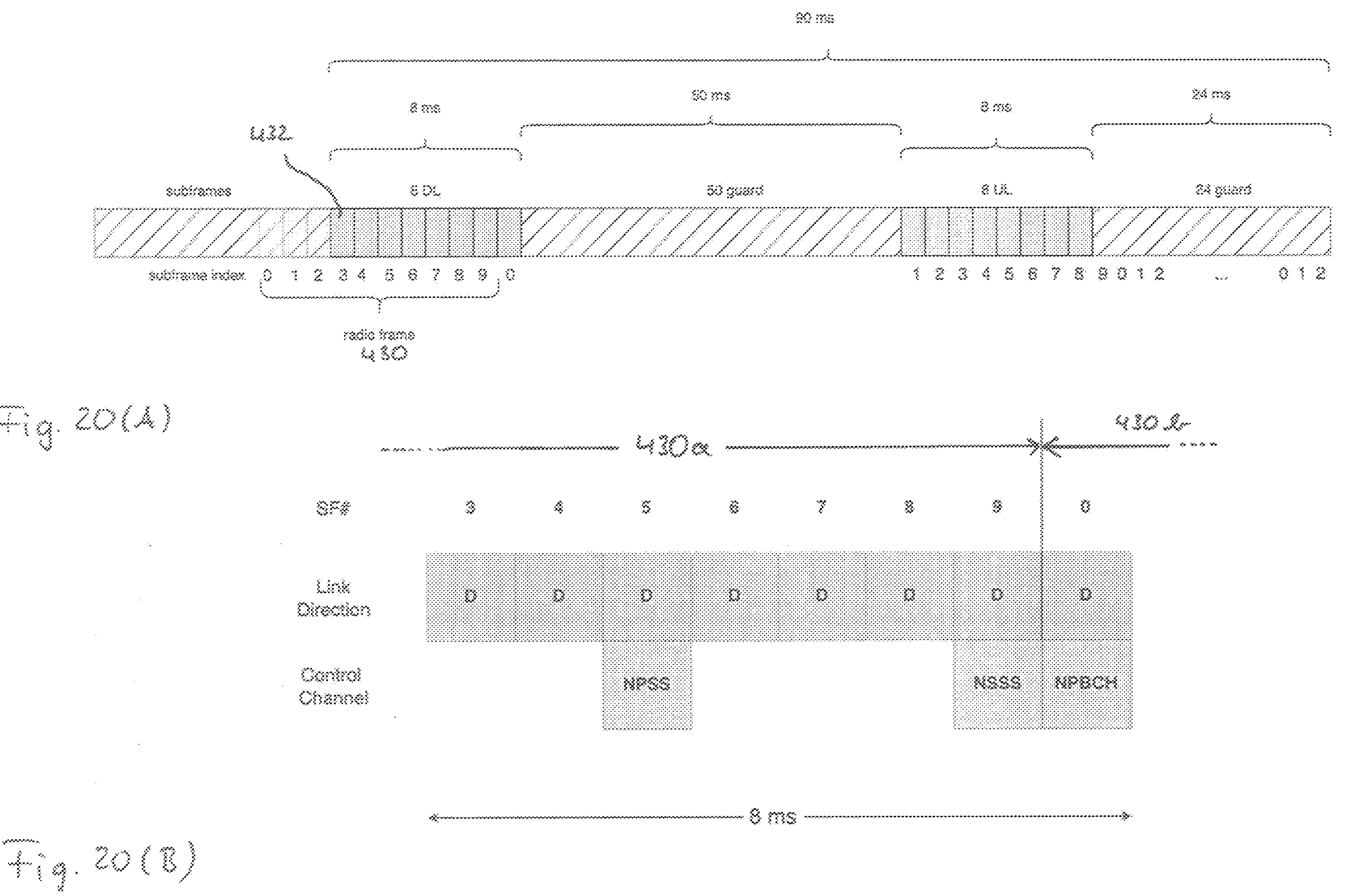
FIG. 20(A) illustrates an embodiment of the frame structure type 1.
FIG. 20(B) illustrates an embodiment of the IoT-NTN TDD downlink subframes of FIG. 20(A)
Figure 20:
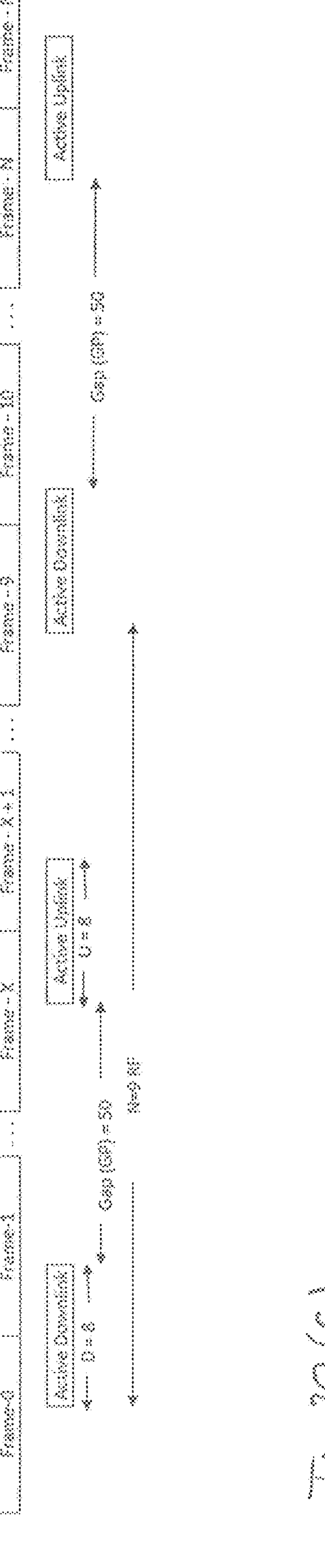

FIG. 20(A) illustrates an embodiment of the frame structure type 1 applicable to NTN-TDD in band 249. Each radio frame 430 is $T_f=307200T_s=10$ ms long and consists of 10 subframes 432 of length $30720T_s=1$ ms, numbered from 0 to 9. Subframe i in $\text{frame}_f$ has an absolute subframe number $$n_{sf}^{abs}=10n_f+i,$$

where $n_f$ is a system frame number. The frame structure for NTN-TDD, at the uplink time synchronization reference point, consists of D=8 consecutive downlink subframes (8 ms), followed by 50 consecutive guard period subframes (50 ms), followed by U=8 consecutive uplink subframes (8 ms), followed by 24 consecutive guard period subframes (24 ms) in each 90 ms interval. The UE does not assume any signal or channel being transmitted in subframes other than in downlink subframes 3, 4, 5, 6, 7, 8, 9, and 0 across two consecutive radio frames.

FIG. 20(B) illustrates an embodiment of the IoT-NTN TDD downlink subframes of FIG. 20(A). More specifically, FIG. 20(B) illustrates the DL subframes 3, 4, 5, 6, 7, 8, 9, and 0 across two consecutive radio frames 430*a*, 430*b* in which a signal or channel is transmitted to the UWE. As is illustrated, in accordance with the above configuration, a broadcast channel NPBCH, and synchronization signals, NPSS and NSSS are transmitted in subframes #0, #5 and #9.

The UE does not transmit any signal or channel on a subframe other than the 8 consecutive uplink subframes. Thus, in the embodiment of FIG. 20(A), D=8, G1=50, U=8, and G2=24, and the UE does not assume any signal or channel to be transmitted to the UE in subframes other than in DL subframes 3, 4, 5, 6, 7, 8, 9, and 0 across two consecutive radio frames, and the UE does not transmit any signal or channel on a subframe other than the 8 consecutive UL subframes. FIG. 20(C) illustrates the IoT-NTN TDD mode using the above described HD-FDD frame structure.

In accordance with embodiments, the UE fully transmits a preamble repetition unit within the U consecutive UL subframes of the predefined interval, like a 90 ms interval, and postpones a transmission of a preamble repetition unit that is partially or not within the U consecutive UL until the U consecutive UL subframes of the next predefined interval.

In accordance with embodiments, a periodicity of a predefined control signaling which is less than the predefined interval, is mapped to a periodicity avoiding the predefined control signaling to fall into the GP. The predefined control signaling may include:

- an access signaling, like a PRACH or NPRACH periodicity of 40 ms being mapped to a 90 ms periodicity, or a PRACH or NPRACH periodicity of 80 ms being mapped to a 180 ms periodicity, or
- a DL control signaling, like a PDCCH or NPDCCH having a monitoring periodicity increased in order to match the predefined interval, e.g., by using monitoring values of 45 ms or 90 ms instead of 4 or 8 milliseconds.

In accordance with embodiments, all UEs are IoT UEs using LTE's narrowband-IoT (NB-IoT) technology, e.g., nomenclature, like NPBCH, NPDCCH, NPDSCH, NPRACH, NPUSCH, etc. The technology used in the guard periods, GP, may be a non-3GPP technology, but the standard may just ignore this. When the UE is located in a NTN TDD serving cell and determines a subframe not being one of the D contiguous or consecutive DL subframes, the UE assumes the subframe to be no narrowband (NB) IoT (NB-IoT) DL subframe.

As mentioned earlier, the UE, in general, does not assume any downlink physical signal or physical channel to be present in any subframe other than within the D contiguous or consecutive DL subframes, and does not transmit any uplink physical signal or physical channel in any subframe other than within the U contiguous or consecutive UL subframes. In accordance with embodiments, a DL transmission of control and/or data or of broadcast information, e.g., system information, SI, such as a system information block, SIB, is skipped or deferred, when the transmission overlaps with a part of the frame not used for a DL transmission, like an UL subframe or the GP. The DL transmission may be deferred to a next possible DL transmission opportunity.

In accordance with embodiments, when the UE operates in the IoT NTN TDD mode and an uplink-downlink subframe timing is not aligned within a NTN gNB, the UE receives from the gNB a signaling of a scheduling offset, e.g., k-Mac. Thus, the UE is configured or preconfigured with the offset, e.g., using the signaling from the gNB. Usually, the subframe structure usually starts with subframe 0, however, given the offset, the subframe structure starts with downlink subframes 3, 4, 5, 6, 7, 8, 9, and 0, as is depicted in FIG. 20(A).

FIG. 20 illustrates the configurations 0-6 of the uplink-downlink configurations illustrated in the table of FIG. 5, with D denoting subframes to be used for a downlink transmission, U denoting subframes to be used for an uplink transmission, and S denoting special subframes to be used for switching between downlink and uplink transmissions. The configurations are associated with the configuration IDs 0-6 as indicated in FIG. 20, which may be signaled dynamically or may be configured or preconfigured with the UE 200 or with the radio device 300. Conventionally, certain configurations were excluded to be used for NB-IoT devices, more specifically, only configurations 1-5 were used, however, in accordance with embodiments of the present invention, this limitation no longer applies, i.e. all of the configurations 0-6 illustrated in FIG. 20 may be applied for the IoT device and/or the radio device.

In accordance with other embodiments, other subframe structures or configurations may be employed, for example, dependent on an amount of data are to be transmitted in the downlink or in the uplink. For an active frame, a so-called downlink heavy frame structure may be used in case of a large number of transmissions in the downlink direction (see, e.g., frame #4 in FIG. 12 to FIG. 14). The TDD configurations of FIG. 20 may be modified such that subframes denoted by D are used for a downlink transmission, subframes denoted by U are neglected (not be used for any transmission) or used for a downlink transmission, and subframes denoted by S are neglected (not used for any transmission) or used for a downlink transmission. In other words, the TDD configurations in FIG. 20 may be modified in such a way that uplink subframes, like those marked with U, are either neglected, meaning that there is no transmission, or that they are also used for downlink transmissions. In accordance with other embodiments, subframes marked for switching, like subframes S, may be used for downlink transmissions as well or may be neglected. Any neglected subframes is not used for transmissions and may be used, for example, for power saving at the radio device 300.

In accordance with embodiments, the UE use time blocks/subframes denoted by S or U are for a downlink transmission when needed by a transmission, e.g., in a scenario having a high data load and/or urgent downlink data to be delivered to the UE and/or a data demand with a latency requirement in the downlink, such that the said data has to be transmitted within a certain time window, e.g., wrt. the availability of the radio device in case the UE and/or the radio device are moving, such that the said data may still be delivered in the downlink before one or more of the following:

- a radio link failure, RLF,
- a handover procedure, e.g., normal handover or a conditional handover, CHO, is triggered.

The UE may neglect time blocks/subframes denoted by S or U dependent on a status of the radio device, e.g., to

- save power when a level of an energy storage falls short of a predefined threshold or an amount of power used power by a radio device, e.g., a satellite or base station, within a certain time period exceeds a predefined threshold
- a mobility-related condition, e.g., a handover condition, e.g., CHO is met,
- a transmission does not need all slots/subframes/half-frames/radioframes/hyperframes,
- a channel condition, e.g., signal strength or interference ratio is above a configured or preconfigured threshold.

In accordance with further embodiments, the UE decide whether a time block/subframes denoted by S or U is neglected or is used for a downlink transmission dependent on one or more of the following:

- an interference situation, e.g., in case no other satellite or radio system radio device performs a transmission within the subframe denoted by S and within a subframe preceding the subframe denoted by S, the subframe denoted by S is used for a downlink transmission,
- a position of the radio device, e.g., in case the radio device is a satellite, and the satellite is moving out of the uplink coverage of the UE, e.g., in case of a non-stationary satellite, e.g., LEO or MEO or a high-altitude platform, HAPS, e.g., a location and/or Ephemeris data of the satellite,
- a position of one or more other radio devices, e.g., a position of another satellite and/or HAPS, which is moving into the coverage of the UE, e.g., a location and/or Ephemeris data, wherein, in case the radio device is crossing the trajectory of the radio device, the subframe denoted by S is neglected.

FIG. 21 illustrates an embodiment for a modified LTE TDD uplink-downlink configuration 5 depicted in FIG. 20 as well as configurations Sa-Se being modified when compared to the configuration 5 so as to obtain a downlink heavy uplink-downlink configuration. In one embodiment, the uplink subframe is neglected, which is illustrated by X in FIG. 21. This indicates that the satellite 300 performs reception in this subframe. In another embodiment, the uplink subframe is modified to be a downlink subframe, marked now with a D and being used for downlink transmissions by the satellite. In yet another embodiment, the special subframe S is also used for a downlink transmission and then set to D or is neglected and then set to X. In accordance with yet other embodiments, those subframes denoted by S and U are used for the downlink transmissions and are labeled D. For subframes marked with S, it may be up to the satellite 300 to decide whether it is needed for transmissions by the satellite, for example when an additional data rate is needed, or whether the satellite refrains from any transmissions and performs power saving. In further embodiments, using the special subframe S for the downlink or neglecting the special subframe S may be decided dynamically, for example dependent on one or more of the following:

- an interference situation, e.g., in case no other satellite or radio system performs a transmission within the subframe denoted by S and within a subframe preceding the subframe denoted by S, the subframe denoted by S is used for a downlink transmission,
- a position of the non-terrestrial device, e.g., a location and/or Ephemeris data of the satellite, e.g., in case the radio device is a satellite, and the satellite is moving out of the uplink coverage of the UE, e.g., in case of a non-stationary satellite, e.g., LEO or MEO or a high-altitude platform, HAPS,
- a position of one or more other non-terrestrial devices, e.g., a location and/or Ephemeris data, wherein, in case the non-terrestrial device is crossing the trajectory of the non-terrestrial device, the subframe denoted by S is neglected.

Figure 16:
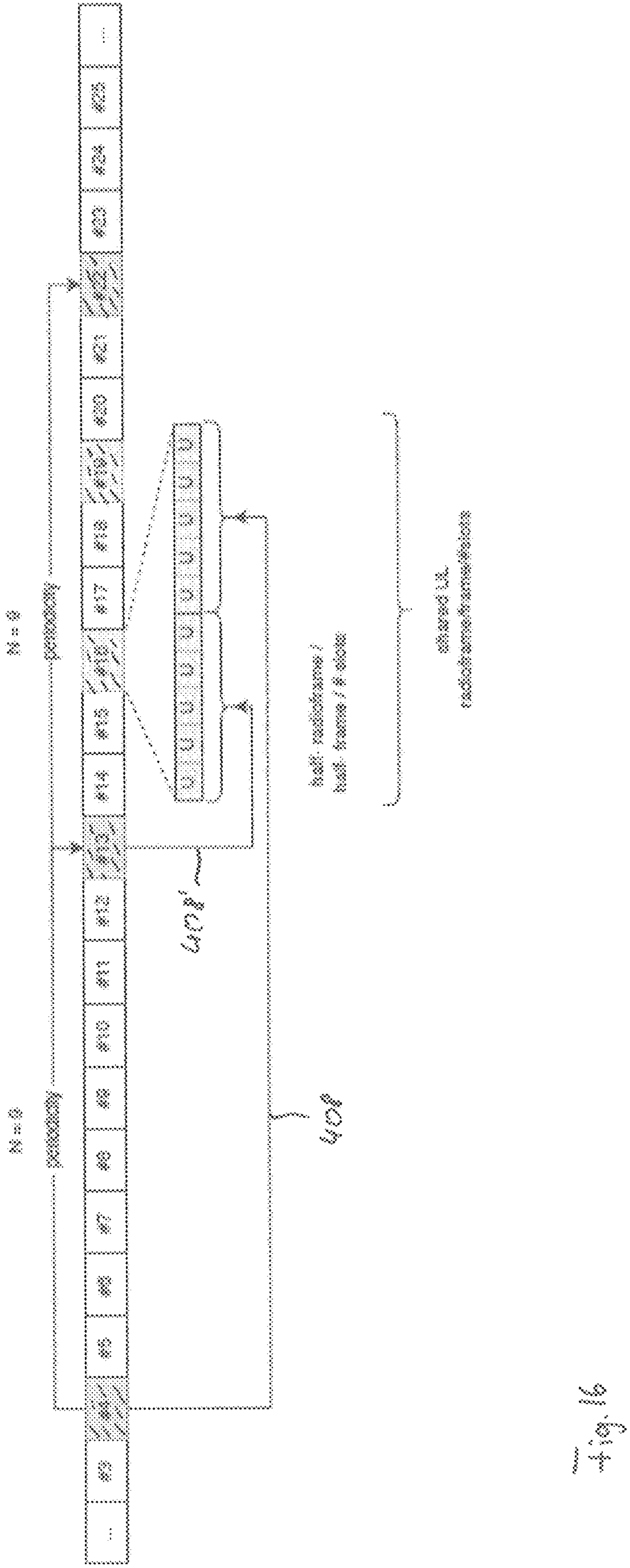
FIG. 16 illustrates a radio signal as in FIG. 15 with UL transmissions associated with two downlink frames being mapped to respective first and second halves of the one uplink frame in accordance with embodiments of the present invention.

In accordance with other embodiments, the frame structure of FIG. 20 may be modified to support more uplink data, also referred to as an uplink-heavy frame structure (see, e.g., frame #13 in FIG. 13 and frame #16 in FIG. 16). Further examples for a modified uplink-heavy frame structure is illustrated in FIG. 22. For example, such an uplink-heavy frame structure may be used in areas with a large number of UEs or IoT devices or in case of a high resource demand in the uplink. In FIG. 22, possible configurations are depicted, where S denotes subframes that may be used for power saving and being marked as inactive, i.e. S may denote subframes being neglected. In FIG. 22, subframes marked with X are subframes which in the configuration of FIG. 20 may be used to transmit downlink signals, broadcast signals and synchronization signals, however, in accordance with the embodiment of FIG. 22, X denotes subframes to be used in a similar way as slots denoted by S, namely, to be inactive or to be active for transmitting additional uplink signals. For example, the behavior may depend on signaling where a UE may be configured or preconfigured with a particular behavior that is well-known to the BS. This behavior enables a UE to adapt its transmission strategy to its

- service demand: in case a UE needs a higher data rate in the uplink, more subframes may be configured for uplink transmissions, U, in case the BS needs a higher data rate in the downlink, more subframes may be configured for downlink transmissions, D.
- a battery requirement: in case a UE needs higher batter savings, more subframes may be neglected, e.g., unused for downlink or uplink transmissions. By configuring such a pattern, a UE may refrain from blind decoding on certain subframes and may fall into a discontinuous reception mode, DRX.

Figure 23:
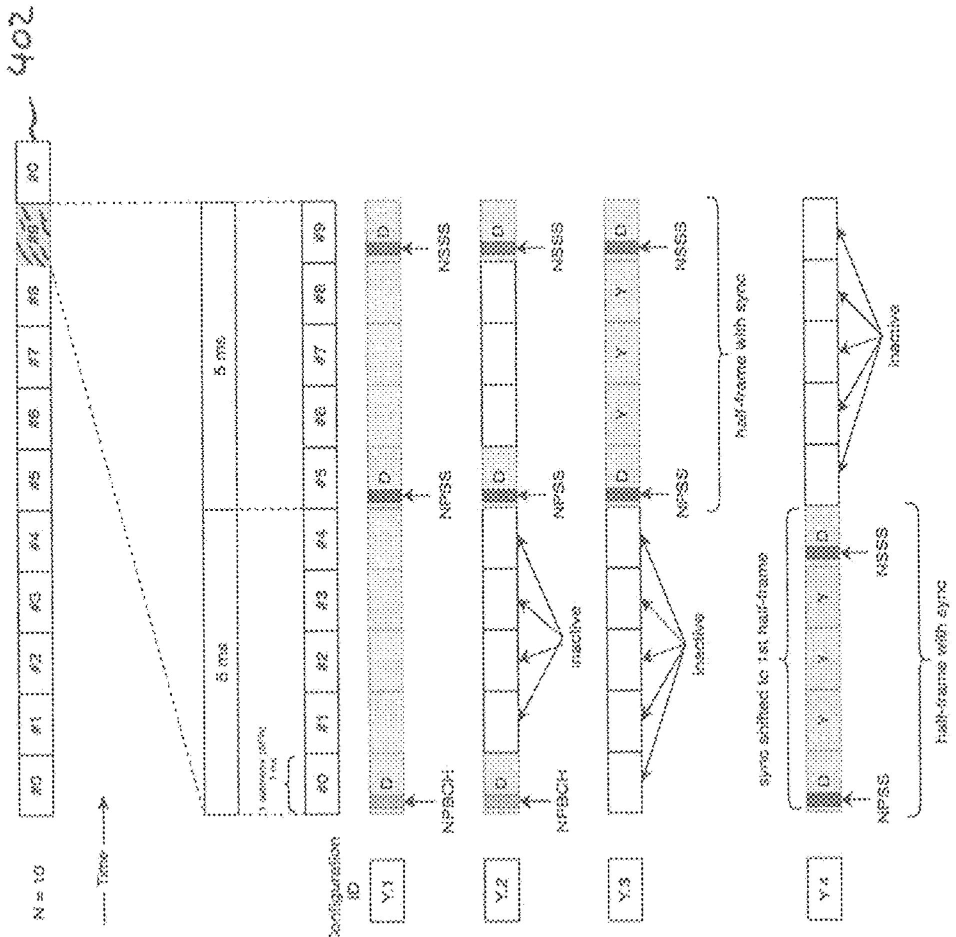
FIG. 23 illustrates uplink-downlink subframe assignments for a TDD configuration in accordance with further embodiments of the present invention.

FIG. 23 illustrates further embodiments of an uplink-downlink subframe assignment for a TDD configuration. FIG. 23 illustrates configurations of the subframes different from what is shown in FIG. 20. In FIG. 23, the configurations are identified as configurations Y.1-Y4.

In accordance with configuration Y.1, a broadcast channel NPBCH, and synchronization signals, NPSS and NSSS are transmitted in subframes #0, #5 and #9. The subframes in-between may be configured according to the frame structure illustrated in anyone of FIG. 20 to FIG. 22.

In accordance with the configuration Y.2, the broadcast and synchronization signals are transmitted as in configuration Y.1, however, the remaining subframes in the respective half-frames are set to inactive, for example to allow the radio device to save power.

In accordance with configuration Y.3, only the synchronization signals are transmitted in subframes #5 and #9. All subframes in the first half-frame are set to inactive, for example to allow the radio device 300 to save power, while the subframes #6 to #8 in the second half-frame may be configured with a frame structure according to anyone of FIG. 20 to FIG. 22.

In the configuration Y.4, the synchronization signals are transmitted in the first half-frame at subframes #0 and #4, while the subframes of the second half-frame are inactive, for example for allowing the radio device to save power. The remaining subframes #1 to #3 in the first half-frame may have a frame structure as described with reference to anyone of FIG. 20 to FIG. 22.

Figure 24:
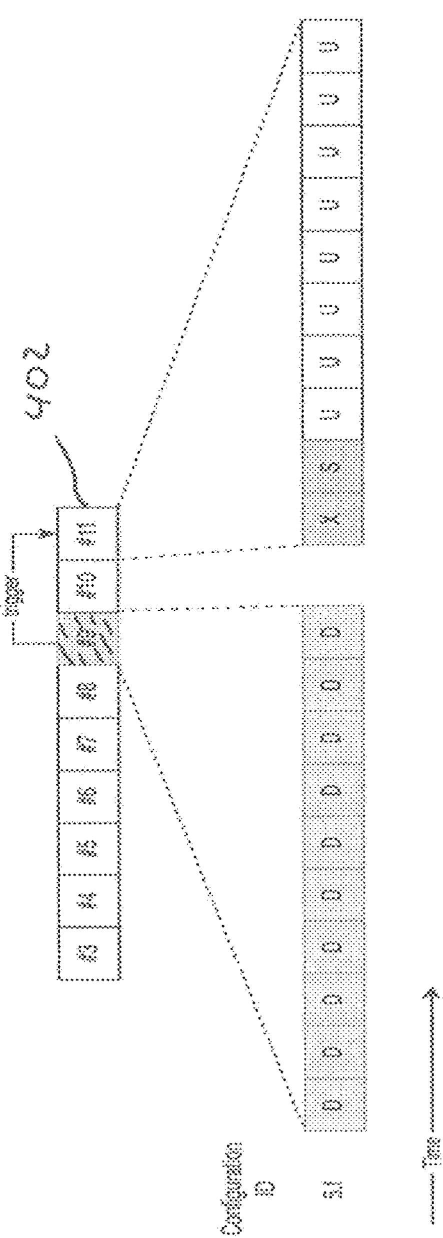
FIG. 24 illustrates an active trigger being applied to a successive frame in accordance with embodiments of the present invention.

In accordance with yet further embodiments of the present invention, an active frame may trigger a certain TDD frame structure in a frame which immediately follows the active frame or follows with an offset, which may be configured or preconfigured, from the currently active frame. FIG. 24 illustrates an embodiment of an active trigger applied to a successive frame. More specifically, frame #9 of the radio signal 402 is assumed to have a configuration according to configuration ID 5.f of FIG. 21. Frame #9 further includes a trigger signal triggering frame #11 (having an offset of one frame) to use a different TDD frame structure, for example the one used in the second subchannel described above with reference to FIG. 16. It is noted that frame #9 may have a configuration as described with reference to anyone of FIG. 20 to FIG. 23, and the successive frame #11 may also have a TDD frame structure as described with reference to anyone of FIG. 20 to FIG. 23. Frame #9 and frame #11 may have the same frame structure or a different frame structure.

General

Although the respective aspects and embodiments of the inventive approach have been described separately, it is noted that each of the aspects/embodiments may be implemented independent from the other, or some or all of the aspects/embodiments may be combined.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and needing input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments of the present invention, the radio device comprises one or more of the following: a macro cell base station, or a small cell base station, or a central unit of a base station, or a distributed unit of a base station, or a road side unit (RSU), or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network, or a non-terrestrial device, e.g., a moving or stationary air-borne device, like a drone, an unmanned aerial vehicle, UAV, or an airplane, or a moving or stationary space-borne device, like a low earth orbit, LEO, satellite, like a LEO-600 satellite or a LEO-1200 satellite, a medium earth orbit, MEO, satellite, or a geosynchronous earth orbit, GEO, satellite.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 25:
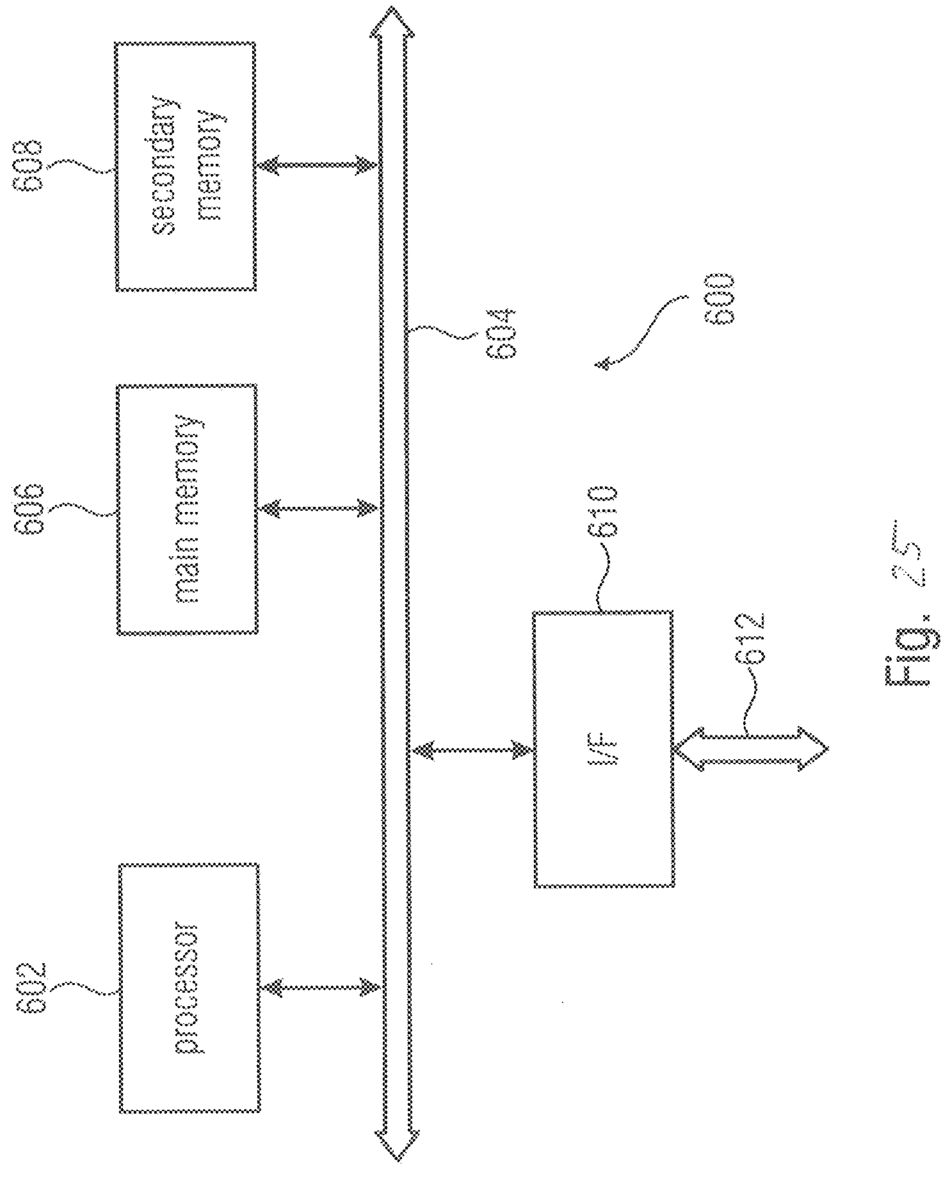
FIG. 25 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 25 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

We claim:

1. A user device, UE, for a wireless communication system, wherein the UE is to communicate with one or more radio devices using a radio signal comprising a plurality of time blocks in a time domain, wherein the radio signal comprises a plurality of time blocks used for a communication between the UE and the one or more radio devices, and one or more additional time blocks not used for a communication between the UE and the one or more radio devices, and wherein the UE is to communicate with one or more of the radio devices using two or more of the time blocks, the two or more time blocks being offset by at least one of the additional time blocks of the radio signal, wherein the one or more radio devices comprise at least one non-terrestrial network (NTN) entity, and the UE operates in a NTN time division duplex (TDD) mode in a TDD band, e.g., in TDD band 249, and wherein the radio signal comprises a frame structure, like a frame structure type 1, with a frame duration of 10 ms and 10 subframes per frame, and at an uplink time synchronization reference point, the frame structure comprises D, e.g., 8, contiguous or consecutive downlink (DL) subframes, followed by G1, e.g., 50, contiguous or consecutive guard period (GP) subframes, followed by U, e.g., 8, contiguous or consecutive uplink (UL) subframes, followed by G2, e.g., 24, contiguous or consecutive guard period (GP) subframes.

2. The user device, UE, of claim 1, wherein each radio frame is $T_f$=307200 $T_s$=10 ms long and consists of 10 subframes of length 30720 $T_s$=1 ms, numbered from 0 to 9, with subframe i in frame $n_f$ comprising an absolute subframe number $$n_{sf}^{abs} = 10n_f + i,$$

where $n_f$ is a system frame number.

3. The user device, UE, of claim 1, wherein the pattern of the D consecutive DL subframes, followed by the G1 consecutive GP subframes, followed by the U consecutive UL subframes, followed by the G2 consecutive GP subframes, is repeated at a predefined interval, e.g., each 90 ms.

4. The user device, UE, of claim 3, wherein D=8, G1=50, U=8, and G2=24, and wherein the UE does not assume any signal or channel to be transmitted to the UE in subframes other than in DL subframes 3, 4, 5, 6, 7, 8, 9, and 0 across two consecutive radio frames, and the UE does not transmit any signal or channel on a subframe other than the 8 consecutive UL subframes.

5. The user device, UE, of claim 3, wherein the UE fully transmits a preamble repetition unit within the U consecutive UL subframes of the predefined interval, like a 90 ms interval, and the UE postpones a transmission of a preamble repetition unit that is partially or not within the U consecutive UL until the U consecutive UL subframes of the next predefined interval.

6. The user device, UE, of claim 3, wherein a periodicity of a predefined control signaling which is less than the predefined interval, is mapped to a periodicity avoiding the predefined control signaling to fall into the GP and wherein the predefined control signaling may comprise:

an access signaling, like a PRACH or NPRACH periodicity of 40 ms being mapped to a 90 ms periodicity, or a PRACH or NPRACH periodicity of 80 ms being mapped to a 180 ms periodicity, or a DL control signaling, like a PDCCH or NPDCCH comprising a monitoring periodicity increased in order to match the predefined interval, e.g., by using monitoring values of 45 ms or 90 ms instead of 4 or 8 milliseconds.

7. The user device, UE, of claim 1, wherein a time block comprises one or more of the following:

a slot, a subframe, a radioframe, e.g., comprising a length of 10 ms, a half-frame, e.g., comprising a length of 5 ms, a hyperframe, e.g., containing one or more slots, subframes, radioframes, or half-frames.

8. The user device, UE, of claim 1, wherein an additional time block comprises one or more of the following:

a slot, a subframe, a radioframe, e.g., comprising a length of 10 ms, a half-frame, e.g., comprising a length of 5 ms, a hyperframe, e.g., containing one or more slots, subframes, radioframes, or half-frames.

9. The user device, UE, of claim 1, wherein a time block and an additional time block comprise the same length, or a different length, with a time block being larger than an additional time block, or a time block being shorter than an additional time block.

10. The user device, UE, of claim 1, wherein the UE is configured or preconfigured with the offset, e.g., using a signaling from the wireless communication system.

11. A radio device, like a gNB or NTN base station, for communicating with one or more user devices, UEs, of a wireless communication system, wherein the radio device is to communicate with the one or more UEs using a radio signal comprising a plurality of time blocks in a time domain, wherein the radio signal comprises a plurality of time blocks used for a communication between the UE and the one or more radio devices, and one or more additional time blocks not used for a communication between the UE and the one or more radio devices, wherein the radio device is to communicate with one or more of the UEs using two or more of the time blocks, the two or more time blocks being offset by at least one of the additional time blocks of the radio signal, wherein the radio device comprise at least one non-terrestrial network (NTN) entity, and the UE operates in a NTN time division duplex (TDD) mode in a TDD band, e.g., in TDD band 249, and wherein the radio signal comprises a frame structure, like a frame structure type 1, with a frame duration of 10 ms and 10 subframes per frame, and at an uplink time synchronization reference point, the frame structure comprises D, e.g., 8, contiguous or consecutive downlink (DL) subframes, followed by G1, e.g., 50, contiguous or consecutive guard period (GP) subframes, followed by U, e.g., 8, contiguous or consecutive uplink (UL) subframes, followed by G2, e.g., 24, contiguous or consecutive guard period (GP) subframes.

12. A method for operating a user device, UE, for a wireless communication system, the method comprising:

communicating with one or more radio devices using a radio signal comprising a plurality of time blocks in a time domain, wherein the radio signal comprises a plurality of time blocks used for a communication between the UE and the one or more radio devices, and one or more additional time blocks not used for a communication between the UE and the one or more radio devices, wherein the UE communicates with one or more of the radio devices using two or more of the time blocks, the two or more time blocks being offset by at least one of the additional time blocks of the radio signal, wherein the one or more radio devices comprise at least one non-terrestrial network (NTN) entity, and the UE operates in a NTN time division duplex (TDD) mode in a TDD band, e.g., in TDD band 249, and wherein the radio signal comprises a frame structure, like a frame structure type 1, with a frame duration of 10 ms and 10 subframes per frame, and at an uplink time synchronization reference point, the frame structure comprises D, e.g., 8, contiguous or consecutive downlink (DL) subframes, followed by G1, e.g., 50, contiguous or consecutive guard period (GP) subframes, followed by U, e.g., 8, contiguous or consecutive uplink (UL) subframes, followed by G2, e.g., 24, contiguous or consecutive guard period (GP) subframes.

* * * * *